US009489851B1

(12) United States Patent
Ross et al.

(10) Patent No.: US 9,489,851 B1
(45) Date of Patent: Nov. 8, 2016

(54) LANDING SIGNAL OFFICER (LSO) INFORMATION MANAGEMENT AND TREND ANALYSIS (IMTA) SYSTEM

(71) Applicant: The United States of America, as represented by the Secretary of the Navy, Washington, DC (US)

(72) Inventors: Michael Gregory Ross, Pacific Grove, CA (US); Michael E. McCauley, Carmel, CA (US); Neil Charles Rowe, Monterey, CA (US); Mathias Kolsch, Carmel, CA (US); Arijit Das, Monterey, CA (US); Terry D. Norbraten, Salinas, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/671,143

(22) Filed: Mar. 27, 2015

Related U.S. Application Data

(63) Continuation-in-part of application No. 14/288,118, filed on May 27, 2014, now abandoned, which is a continuation-in-part of application No. 13/588,207, filed on Aug. 17, 2012, now abandoned.

(60) Provisional application No. 61/525,099, filed on Aug. 18, 2011.

(51) Int. Cl.
*G08G 5/00* (2006.01)
*B64F 1/36* (2006.01)
(Continued)

(52) U.S. Cl.
CPC .............. *G08G 5/0043* (2013.01); *B64F 1/36* (2013.01); *G06F 3/0488* (2013.01); *G06F 3/04847* (2013.01)

(58) Field of Classification Search
CPC ... G08G 5/0043; B64F 1/36; G06F 3/04847; G06F 3/0488
USPC .......................................................... 701/16
See application file for complete search history.

(56) References Cited

U.S. PATENT DOCUMENTS 3,484,549 A    12/1969   Ricketts et al.
3,991,486 A    11/1976   Derderian et al.
(Continued)

OTHER PUBLICATIONS

Windows Touch & Excel 2010, Oppenheimer, Diego, 4pages, Feb. 18, 2010, available online @ https://blogs.office.com/2010/02/18/windows-touch-excel-2010/, last accessed Sep. 21, 2015.*

(Continued)

*Primary Examiner* — Behrang Badii
*Assistant Examiner* — Daniel L Greene
(74) *Attorney, Agent, or Firm* — Naval Postgraduate School; James B. Potts; Lisa A. Norris

(57) ABSTRACT

Embodiments in accordance with the invention provide a Landing Signal Officer (LSO) Information Management and Trend Analysis (IMTA) system for electronically capturing landing performance data related to aircraft approaches and landings in an IMTA application residing on a portable electronic device (PED) and for automatically generating performance data and trend analysis of the data. In one embodiment, data is input by user, such as an LSO, to one or more context sensitive graphical user interfaces displayed on a touch screen PED. Data entered to and generated by the IMTA application can be further communicated to and updated by external computer systems and appended with additional data and/or video available from external computer systems.

9 Claims, 22 Drawing Sheets

(51) Int. Cl.
*G06F 3/0484* (2013.01)
*G06F 3/0488* (2013.01)

(56) References Cited

U.S. PATENT DOCUMENTS

| | | | | |
|---|---|---|---|---|
| 5,195,033 | A * | 3/1993 | Samph | G09B 7/06 434/323 |
| 5,469,371 | A | 11/1995 | Bass | |
| 6,750,864 | B1 | 6/2004 | Anwar | |
| 8,204,637 | B1 * | 6/2012 | Everson | G06Q 30/0201 345/440 |
| 8,456,329 | B1 * | 6/2013 | Tran | G08C 17/02 341/20 |
| 2002/0082769 | A1 | 6/2002 | Church et al. | |
| 2002/0173883 | A1 | 11/2002 | Ezaki | |
| 2004/0229199 | A1 * | 11/2004 | Ashley | G09B 7/00 434/323 |
| 2007/0250224 | A1 * | 10/2007 | Dwyer | G01C 23/005 701/16 |
| 2009/0249129 | A1 | 10/2009 | Femia | |
| 2010/0001882 | A1 | 1/2010 | Jeddi | |
| 2010/0042289 | A1 | 2/2010 | Beacham, Jr. | |

OTHER PUBLICATIONS

Bricston, Clyde. Automated Performance Measurement for Naval Aviation: APARTS, A Landing Signal Officer Training Aid, 1981, pp. 445-448.
Windows Touch & Excel 2010, Oppenheimer, Diego, 4 pages, Feb. 18, 2010, available online at https://blogs.office.com/2010/02/18/windows-touch-excel-2010.

* cited by examiner

LANDING SIGNAL OFFICER (LSO) INFORMATION MANAGEMENT AND TREND ANALYSIS (IMTA) SYSTEM

CROSS-REFERENCE TO RELATED APPLICATIONS

This application is a continuation-in-part of U.S. patent application Ser. No. 14/288,118, filed May 27, 2014, which is a continuation-in-part application of U.S. patent application Ser. No. 13/588,207, filed Aug. 17, 2012, which further claims the benefit of U.S. Provisional Patent Application No. 61/525,099, filed Aug. 18, 2011, all of which are hereby incorporated in their entirety by reference and the benefits of all is hereby claimed.

BACKGROUND OF THE INVENTION

1. Field of the Invention

The present invention relates generally to management and generation of data related to aviation.

2. Description of the Related Art

In the United States Navy, specially designated naval aviators serve as Landing Signal Officers (LSOs), and are responsible for ensuring the safe and expeditious landing of aircraft aboard aircraft carriers. In order to meet this responsibility, LSOs keep detailed records on every approach and landing aboard all US Navy aircraft carriers. This data is reviewed by LSOs to help identify pilot trends and improve pilot landing performance.

Currently, this approach and landing data is recorded by hand on a form, using shorthand symbols defined in a Landing Signal Officer manual. The data are then manually transcribed into a computer database, currently the Automated Performance Assessment and Remedial Training System (APARTS), for separate limited analysis of the data. Additionally, during qualification of pilots to operate in the carrier environment, the LSO uses the handwritten data, in conjunction with a number of charts, to calculate metrics related to pilot performance in order to determine whether or not an individual pilot meets qualification standards.

SUMMARY OF THE INVENTION

Embodiments in accordance with the invention provide a Landing Signal Officer (LSO) Information Management and Trend Analysis (IMTA) system for electronically capturing landing performance data related to aircraft approaches and landings in an Landing Signal Officer (LSO) Information Management and Trend Analysis (IMTA) application residing on a portable electronic device (PED) and automatically generating performance data and trend analysis of the data. In one embodiment, the LSO IMTA application resident on each of one or more portable electronic devices (PEDs), such as a touch screen personal electronic device, receives inputs of landing performance data, such as data inputs by an LSO, and automatically generates performance data and trend analysis of the input data which can be displayed to the user. In one embodiment, the data input to and/or generated by the LSO user application is automatically communicated to one or more IMTA applications resident on each of one or more computer systems for further analysis. In one embodiment, the graphical user interface displayed on the PED can be rendered with a dark background, such as black, and also display visible options and data in a night vision compatible color(s), such as green, to minimize the impact on an LSO's vision.

Embodiments in accordance with the invention allow the process of collecting approach and landing data to be gathered more quickly and accurately than current methods allow and frees the LSO to devote more attention to ensuring the safety of naval aviators. The IMTA system eliminates the need to transcribe hand gathered data into a central database system, such as the prior art APARTS, and automatically generates performance and trend analysis of the data for the LSO without separate transcription to a central database system. Further the system provides enhanced data management and analysis tools on the LSO user application and automatically communicates the data and/or generated data to an IMTA application resident at other locations for further analysis.

Embodiments in accordance with the invention are best understood by reference to the following detailed description when read in conjunction with the accompanying drawings.

BRIEF DESCRIPTION OF THE DRAWINGS

FIG. 10 illustrates an example of a context sensitive keyboard graphical user interface containing shorthand symbols arranged alphabetically from numerical symbols to the symbol "NERD" in accordance with one embodiment.

FIG. 11 illustrates an example of a context sensitive keyboard graphical user interface containing the remaining shorthand symbols not displayed in FIG. 10 in accordance with one embodiment.

FIG. 20 illustrates an example of "cumulative grade table," a graphical user interface based on a paper table that LSOs use to reference the current pilot performance.

Figure 1:
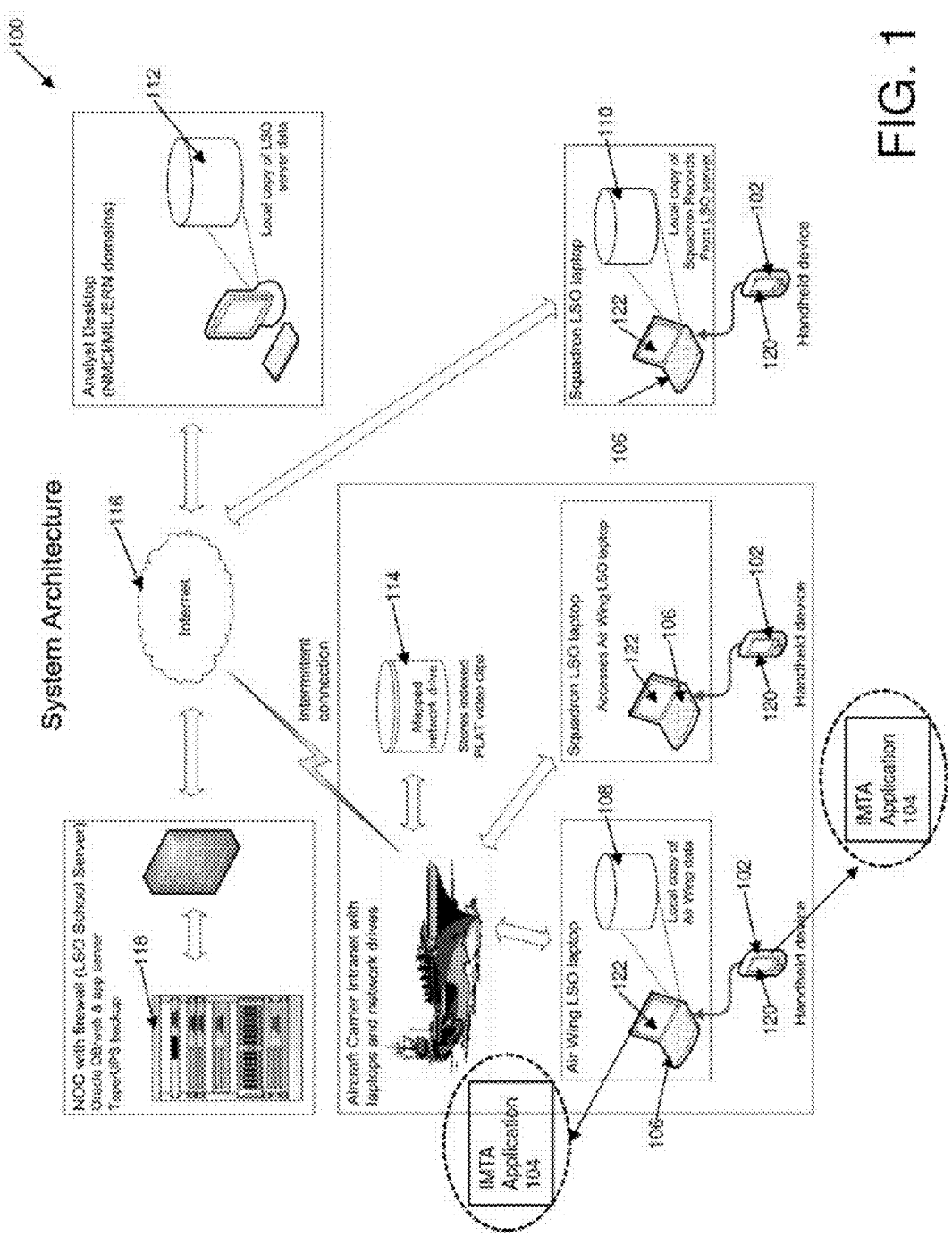
FIG. 1 illustrates a high level architecture of a Landing Signal Officer (LSO) Information Management and Trend Analysis (IMTA) system in accordance with one embodiment.

Embodiments in accordance with the invention are further described herein with reference to the drawings.

DETAILED DESCRIPTION OF THE INVENTION

Embodiments in accordance with the invention provide a Landing Signal Officer with a tool to expedite data collection while enhancing accuracy. In one embodiment, a LSO Information Management and Trend Analysis (IMTA) application embodied as a software application on a touch screen based portable electronic device (PED), receives and stores data input by a user, such as an LSO, via a graphical user interface displayed on the device screen. Data input to the PED via the graphical user interface can be uploaded to one or more databases for further analysis.

In one embodiment, one or more graphical user interfaces include a number of specialized touch screen virtual keyboards which are presented to a user, e.g., an LSO, based on the context of the data being entered, allowing the user to rapidly enter data by tapping keys on the virtual keyboards displayed in the graphical user interface with a stylus or finger.

In one embodiment, based on the syntax of the shorthand symbols defined in a landing signal officer manual, when subsequent symbols can be determined from the data previously entered by a user, these symbols are automatically added to the string of data collected. In certain circumstances, data entered by the user in text format is displayed with a dedicated graphical symbol instead of an alphanumerical character according to the shorthand symbols defined in the landing signal officer manual.

In one embodiment, based on user data inputs, the IMTA application determines the length of time between aircraft approaches and the length of time an aircraft spends on final approach (also termed the "groove"). If the time spent on final approach is outside of the tolerances specified in a landing signal officer manual the appropriate shorthand symbols are appended to the landing's record maintained in the method.

In one embodiment, during carrier qualification training, the method automatically calculates and updates the pilot's grade point average and boarding rate (as defined in the landing signal officer manual based on data recorded and displays the information on the graphical user interface.

In one embodiment, landing records can be displayed to the LSO for review grouped by time period, military unit, or individual pilot.

In one embodiment, for night operation, the entire graphical user interface can be rendered with night viewing compatible coloration, such as a black background and dark green, features to minimize the impact on the LSO's night vision.

Herein although the invention is described with reference to data inputs required by an example landing signal officer's log, shorthand symbols defined in an example landing signal officer manual, and definitions outlined in an example manual, those of skill in the art can recognize that other aviation operational rules and guidelines as to required data inputs, shorthand symbols, and definitions can be used instead to meet the need of a particular aviation community.

FIG. 1 illustrates a high level architecture of a LSO IMTA system 100 in accordance with one embodiment. Referring to FIG. 1, system 100 includes one or more handheld data collection devices, illustrated as portable electronic devices 102, each including an IMTA application 104 executing on device 102. In one embodiment, device 102 typically includes a central processing unit (CPU), an operating system, an input/output (I/O) interface, and a memory. In one embodiment, device 102 includes a display screen 120, as well as one or more standard input-output (I/O) ports, for inputting data to and outputting data from device 102. In one embodiment, IMTA application 104 is loaded into device 102 via an I/O port, such as from a CD, DVD, USB input, or other digitally communicable form containing IMTA application 104, and stored in a memory of device 102. In one embodiment IMTA application 104 may further include an interface to allow communication with other systems on IMTA system 100.

A central processing unit (CPU), an operating system, an input/output (I/O) interface, a memory, a display screen and standard input-output devices and ports, general storage of applications in memory and general execution of applications by operating systems are well known to those of skill in the art.

In one embodiment, device 102 is a touch screen enabled device capable of receiving user inputs via finger touch or stylus touch to display screen 120 in relation to a displayed graphical user interface. In one embodiment, IMTA application 104 generates and displays graphical user interfaces to a user, such as an LSO, and allows the user to input data into IMTA application 104. In one embodiment, IMTA application 104 generates and displays one or more touch screen compatible graphical user interfaces that allow the user to enter data by touch on touch sensitive screen 120 of device 102. Entry of data via a touch screen graphical user interface on a touch screen enable device is well known to those of skill in art and not further described herein.

In one embodiment, IMTA application 104 stores the received data and can automatically generate performance data and trend analysis data of the input data which can be displayed to the user. In one embodiment, user method application 104 communicates input data and/or generated performance data and trend analysis data to a computer 106, such as a laptop computer, for example to an air wing LSO laptop computer 106 and/or to a squadron laptop computer 106, having a resident IMTA application 104.

In one embodiment, data transfer from device 102 to computer 106 is accomplished via a Universal Serial Bus (USB) cable due to the lack of 802.11 networks aboard aircraft carriers, and the prevalence of USB ports in both Navy Marine Corps Intranet (NMCI) and outside continental United States (OCONUS) Navy Enterprise Network (ONE-NET) laptops. USB cables, connectivity, and interface specifications are well known to those of skill in the art and not further detailed herein. In other embodiments, in environments where wireless connectivity is available, data from user device 102 to computer 106 can be wirelessly accomplished over a network, such as an intranet, or internet 116.

Computers 106 typically include a central processing unit (CPU), an operating system, an input/output (I/O) interface, and a memory. In one embodiment, computers 106 include a display screen 122, as well as one or more standard input-output (I/O) ports, for inputting data to and outputting data from computer 106. In one embodiment, IMTA application 104 is loaded into computer 106 via an I/O port, such as from a CD, DVD, USB input, or other digitally communicable form containing IMTA application 104 and stored in a memory of computer 106.

One or more computers 106 collect the data received from devices 102 and can communicate the data for storage to a database, for example to an air wing database 108, to a squadron database 110, and/or to a mapped network drive 114 on a ship, such as an aircraft carrier. In some embodiments, network drive 114 stores indexed Pilot Landing Aid Television (PLAT) video clips that can be associated with data received from devices 102. In one embodiment, the data in computer 106 and/or the database, e.g., 108, 110, can be further communicated over a network, such as the Internet 116, to a centralized server database 112 and/or to an LSO school server 118, for further analysis and/or backup.

In one embodiment, synchronization of device 102 with the IMTA application 104 resident on computer 106 is accomplished via a Universal Serial Bus (USB) cable due to the lack of 802.11 networks aboard aircraft carriers, and the prevalence of USB ports in both NMCI and ONE-NET laptops. USB cables, connectivity, and interface specifications are well known to those of skill in the art and not further detailed herein.

In other embodiments, in environments where wireless connectivity is available, synchronization between device 102 and computers 106 can be wirelessly accomplished. In one embodiment, the synchronization process pulls records from IMTA application 104 on device 102 into IMTA application 104 on computer 106 and pushes requested records from IMTA application 104 on computer 106 to IMTA 104 on device 102 for mobile viewing by the user. IMTA application 104 on device 102 can also be updated in this manner.

In one embodiment, IMTA application 104 generates displays a plurality of graphical user interfaces on display screen 122 of device 102, dependent upon a selected user context, to permit the entry and display of data on device 102 and other touch screen compatible computer systems on which IMTA application 104 is installed. In one embodiment, IMTA application 104 includes several process modes as further described below with reference to FIGS. 2-22. These examples are not intended to be all inclusive and fewer or more graphical user interfaces and/or process modes may be included in various embodiments of the invention. In one embodiment, IMTA 104 includes: a pre-recovery set up mode; a recovery mode; and a review mode.

In one embodiment, recovery mode includes entries found in an LSO paper log book. Thus, the recovery mode allows quick and efficient inputs of data previously handwritten in the LSO paper log book. In one embodiment, recovery mode displays data on recent passes including the associated comments, using a font sized to accommodate over-the-shoulder reading. In one embodiment, recovery mode includes a context-sensitive touch screen graphical user interface (GUI) keyboard that facilitates recording pass data on the platform. In one embodiment, the graphical user interface keyboard on device 102 starts with a "Lens On" button, which starts interval timing.

For example, for day Case I recoveries, this action is followed by a "Start Groove Timing" button, which will be tapped by the user when the first (and subsequent) aircraft roll into the groove. Next, the user is presented with GUI buttons corresponding to the side numbers of aircraft airborne based on the pre-recovery setup. As an aircraft traps, the user will tap the associated aircraft side number, which will stop and record interval and groove length timing, and record the side number and pilot name "on the next line of the log book" in the graphical user interface.

Following side number selection, the user is presented with GUI buttons indicating wire-caught events and the grade for the pass. The final GUI keyboard presents GUI buttons corresponding to the most frequently used LSO shorthand terms, allowing the user to quickly type out pass comments. If a required term is not available, a touch screen scratchpad is available to the right of the GUI keyboard for virtual touch screen handwritten notes for the recovery review. In one embodiment, if conducting field carrier landing practices (FCLPs) or carrier qualifications (CQs), a pull-down requirement summary is available in the recovery mode which will automatically update based on passes entered, and can be quickly viewed and hidden between passes.

Figure 4:
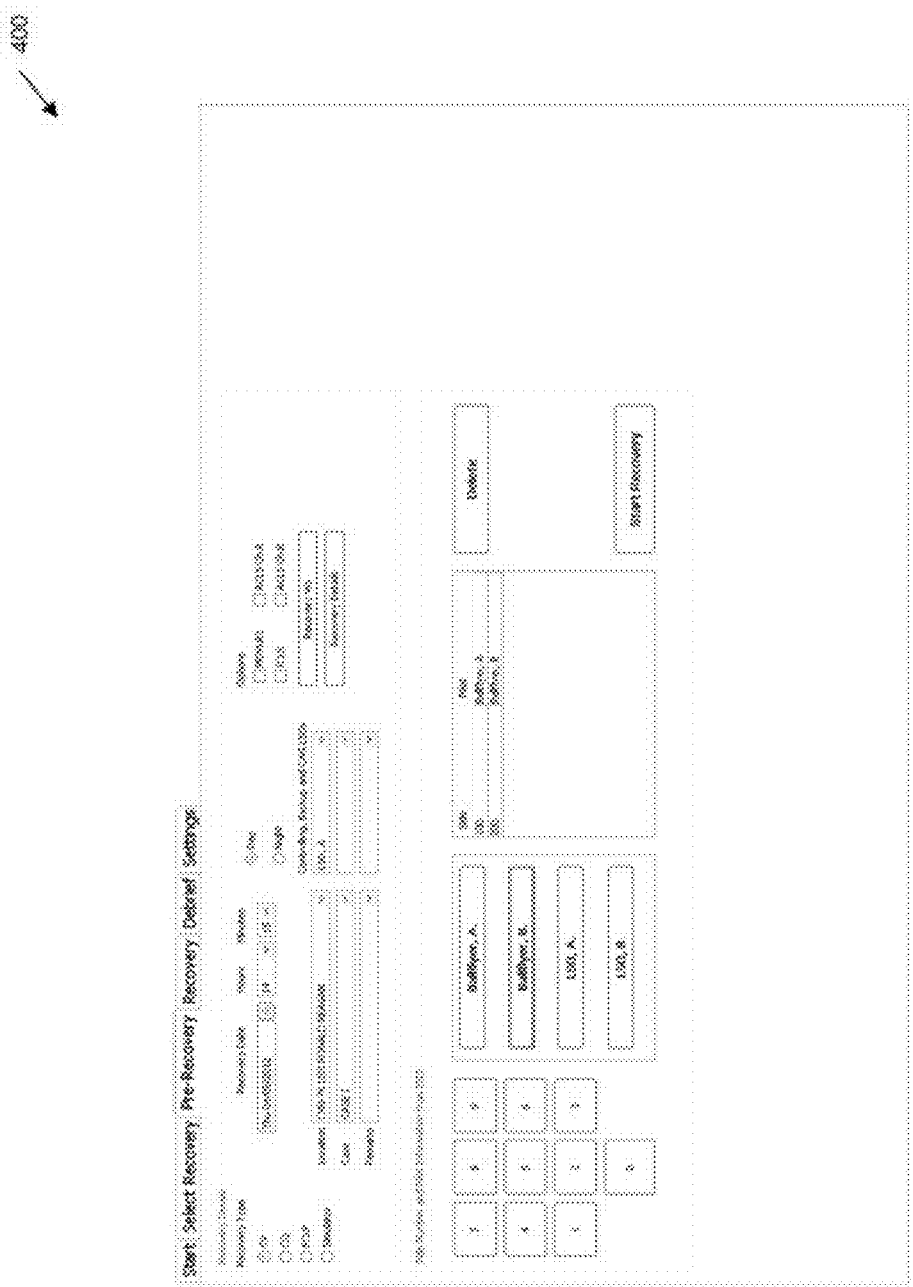
FIG. 4 illustrates an example of options presented on a "Pre-Recovery" tab graphical user interface in accordance with one embodiment.

FIG. 4 illustrates an example of a review mode graphical user interface displayed on device 102 generated by IMTA application 104. In one embodiment, in recovery mode, after a recovery, LSOs typically gather below the platform to review each pass of the recovery, and ensure the comments are correctly recorded in the log book. Device 102 is placed in Review Mode and the LSO, e.g., user, can edit any field in the GUI log application and type in comments handwritten in the GUI scratchpad via an onscreen QWERTY keyboard. In one embodiment, Review Mode generates an overview of the log book and data entries, from which LSOs can conduct pilot debriefs.

In one embodiment, IMTA application 104 is capable of operating in three operational modes: Host, Client and Standalone. In one embodiment, aboard the ship, one copy of IMTA application 104 is designated to run in Host Mode, for example, normally the copy running on the Commander Air Group (CAG) LSO laptop, e.g., a computer 106. This copy of IMTA application 104 maintains a local copy of the air wing's data, and coordinates communication with LSO School server 118. When data from a device 102 is uploaded to a copy of IMTA application 104, the host automatically makes it available to all copies of IMTA application 104 running in Client Mode attached to the ship's network. Host Mode also provides synchronization with LSO school server 118, if an internet connection is available. In one embodiment, data is uploaded to server 118 and download data requested by clients, using techniques to ensure data integrity in both directions. In one embodiment, the host coordinates with LSO School server 118 to obtain current versions of the current IMTA application 104 software and interface.

In one embodiment, in Client Mode, IMTA application 104 keeps a copy of the data being worked with, but communicates changes to that data back to the host, for upload to LSO School server 118. In Standalone Mode, IMTA application 104 keeps a copy of the squadron's records (or the records concerned). When a connection to the internet is available, IMTA application 104 connects with LSO School server 118 to synchronize data and retrieve software updates as required.

In one embodiment, IMTA application 104 also includes the following mode-independent capabilities: manual data entry; report generation and night currency. In one embodiment, in manual data entry, users are provided an interface which can be used to manually enter, edit or review approach data. In report generation, IMTA application 104 provides the ability to automatically generate the following reports: Night Currency (and required date of next night flight in order to maintain currency), CQ Requirements based on currency, and trend analysis letters. In trend analysis, IMTA application 104 provides enhanced trend analysis tools to identify pilot trends which can help aid the LSO community in directing training.

In one embodiment, a visualization interface to IMTA application 104 allows review of pass data, including grade, and associated video. In one embodiment, PLAT video is obtained from the live video distribution system throughout the ship, for example, in a ready-room. In one embodiment, the CAG LSO laptop device, e.g., a computer 106, is outfitted with a PCMCIA video capture card to digitize the analog video stream, for example, Imperx VCE-B5A01. The digitized video is then processed, stored in short audio video interleave (AVI) files, and a reference to the file made in the database entry in mapped network drive 114 of the respective approach.

In one embodiment, LSO School server 118 includes a database running on a server, and provides the following capabilities: receives and archives data uploaded from IMTA application 104 systems distributed across the fleet, ensures data integrity in case of interrupted transmissions; provides data back-up capability; supplies data requested by IMTA applications 104; provides software updates to both the IMTA application 104 and device 102 interface; maintains a master pilot list; maintains a master user list.

As part of the connection sequence, the LSO School server identifies the software version of the connecting IMTA application 104; if the connecting IMTA application 104 is out of date, the user will be prompted to download and install the current software. The user can choose to defer the update for a period of time.

In one embodiment, LSO School server 118 maintains a master list of unique, formally structured pilot names and identifying data. In one embodiment, new pilot names can be created during initial field carrier landing practices (FCLP) training. When a pilot reports to a squadron, a user of a device including IMTA application 104 connects to LSO School server 118, associates that pilot with their new squadron, recording their report date, and then downloads the pilot's records. When the pilot detaches from the squadron, a user of a device including IMTA application 104 uploads the detach date, along with any un-uploaded records for that pilot, while removing those records from the squadron's local copy of data. This process allows a pilot's records to follow him/her throughout their career as they move between squadrons and through non-flying tours, while the data maintained locally by squadrons will be limited to their current personnel.

In one embodiment, LSO School server 118 also maintains a list of users who may access the database. User names can follow the same structure as pilot names (allowing pilots to have unified pilot and user names). In one embodiment, user rights are hierarchical, meaning a member of a higher-ranked group has all of the access privileges of a lower-ranked group, and users will be able to move between groups as assignments dictate. An example of a user list is shown in Table 1.

| User Group | Access Rights |
|---|---|
| LSO School OIC | Read/write over all records |
| LSO School Staff | Create new users and administer privileges |
| Fleet LSOs | at any level |
| CAG LSO | Read over all records |
| | Write over records currently assigned to CVW (air wing) |
| | Create CAG users |
| | Assign Squadron Head LSO privileges |
| Squadron Head LSO | Read over all records |
| | Write over records currently assigned to squadron |
| | Assign Squadron LSO privileges |
| | Create CO and Schedule Officer users |
| | Attach and detach pilots from command |
| Squadron LSO | Read over all records |
| | Write over records where Squadron LSO is listed as the controlling or back-up LSO |
| Pilot | Read their individual records only |
| CAG | Read over all records |
| Squadron CO | |
| Analyst | |
| Schedules Officer | View current summaries only |

In one embodiment, the data in the user list is password-protected to prevent modification, accidental or otherwise, on all the systems involved. As shown in Table 1, only a few people need to access these systems. Integrity can be enhanced by backing up the systems periodically, for example once a month. A guarantee of completeness can be enhanced by having redundant uploads and downloads, which can be from every month to every time of upload or download.

Figure 2:
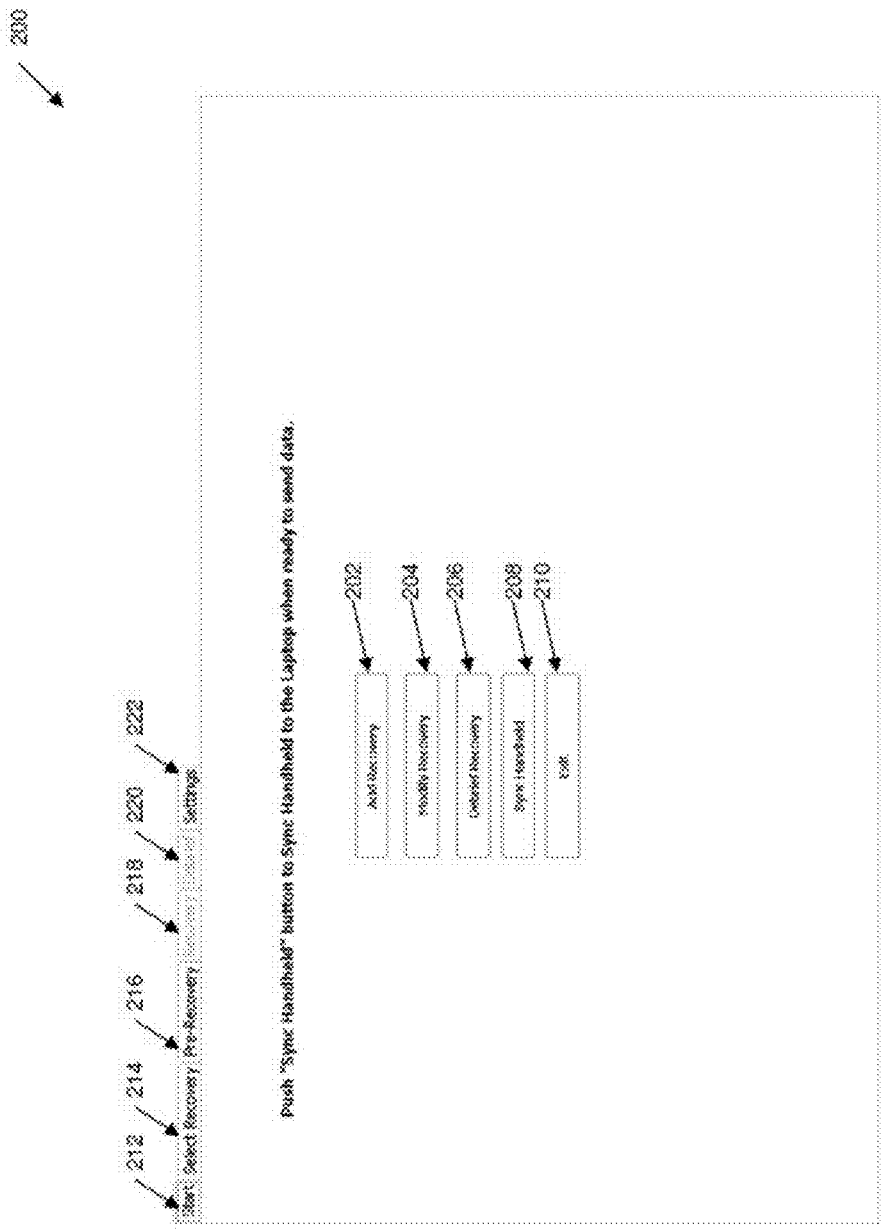
FIG. 2 illustrates an example of initial options presented on a "Start Tab" graphical user interface in accordance with one embodiment.

FIGS. 2-22 illustrate examples of graphical user interface screens generated by IMTA application 104 and presented to a user allowing input of data to IMTA application 104 and LSO IMTA system 100. FIG. 2 illustrates an example of initial options presented on a "Start Tab" 212 of graphical user interface 200 in accordance with one embodiment. As illustrated, button selection options allow a Landing Signal Officer to "Add Recovery" 202, "Modify Recovery" 204, or "Debrief Recovery" 206 on a group of landings (referred to as a "Recovery"), to synchronize the data on the device with a central database, "Sync Handheld" 208, or to exit IMTA application 104, "Exit" 210. Further groups of features are displayed in tabs across the top of the display. These tabs include "Select Recovery" 214, "Pre-Recovery" 216, "Recovery" 218, "Debrief" 220, and "Settings" 222, mimicking the typical LSO workflow.

Figure 3:
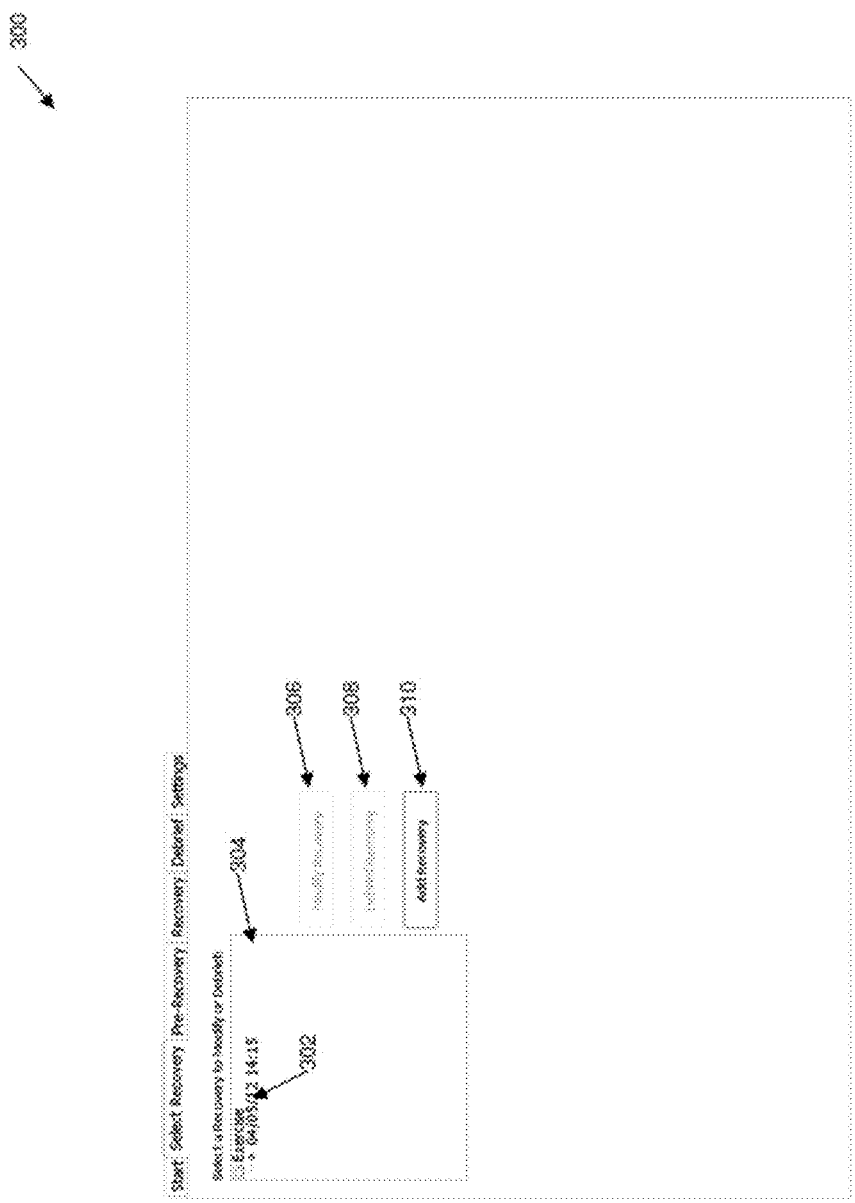
FIG. 3 illustrates an example of options presented on a "Select Recovery" tab graphical user interface in accordance with one embodiment.

FIG. 3 illustrates an example of options presented on a "Select Recovery" tab graphical user interface 300 in accordance with one embodiment. On the left, the user is provided the ability to select a recovery, for example, recovery 302 in menu 304 stored on device 102 for display and/or editing. Buttons on the right allow the user to modify the recovery, "Modify Recovery" 306, debrief the recovery, "Debrief Recovery" 308, or add a new recovery, "Add Recovery" 310.

FIG. 4 illustrates an example of options presented on a "Pre-Recovery" tab graphical user interface 400 in accordance with one embodiment. Pre-recovery setup mode allows a user, such as an LSO, to enter basic recovery information, such as before transiting up to an LSO platform. Data associated with the recovery can be entered using a combination of radio buttons, check boxes, and drop down lists. Radio buttons, check boxes, and drop down lists are graphical user interface constructs well known to those of skill in the art and are not further detailed herein.

Figure 5:
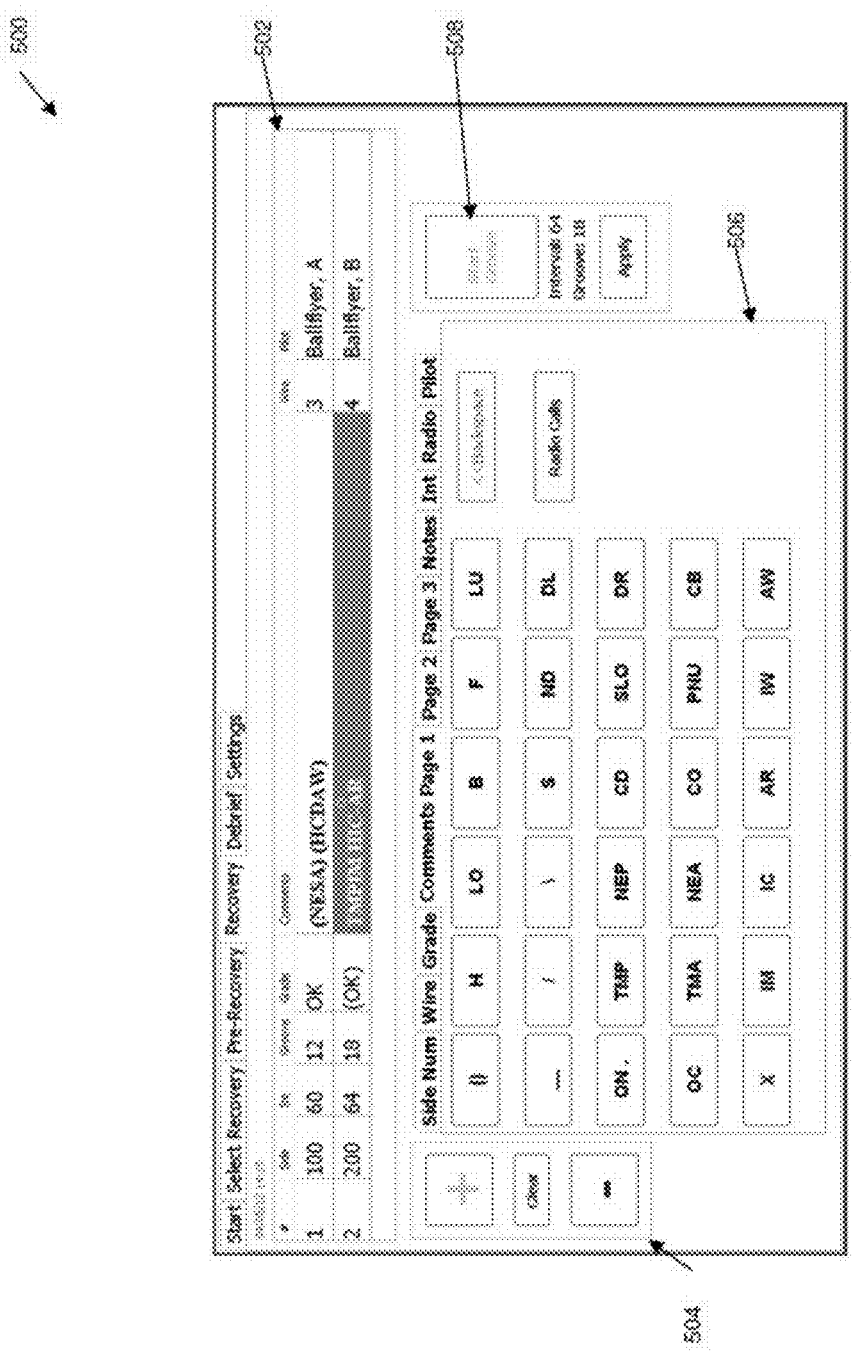
FIG. 5 illustrates an example of options presented on a "Recovery" tab graphical user interface in accordance with one embodiment.

FIG. 5 illustrates an example of options presented on a "Recovery" tab graphical user interface 500 in accordance with one embodiment. The top portion of GUI 500 includes a table 502 which depicts the data associated with each approach/landing. The bottom portion of GUI 500 displays a button keyboard 504 used to add and remove approaches, a set of context sensitive keyboards 506 which allow the LSO to enter data, and a button keyboard 508 to facilitate the timing of the interval between landings and the time an aircraft spends on final approach.

Figure 6:
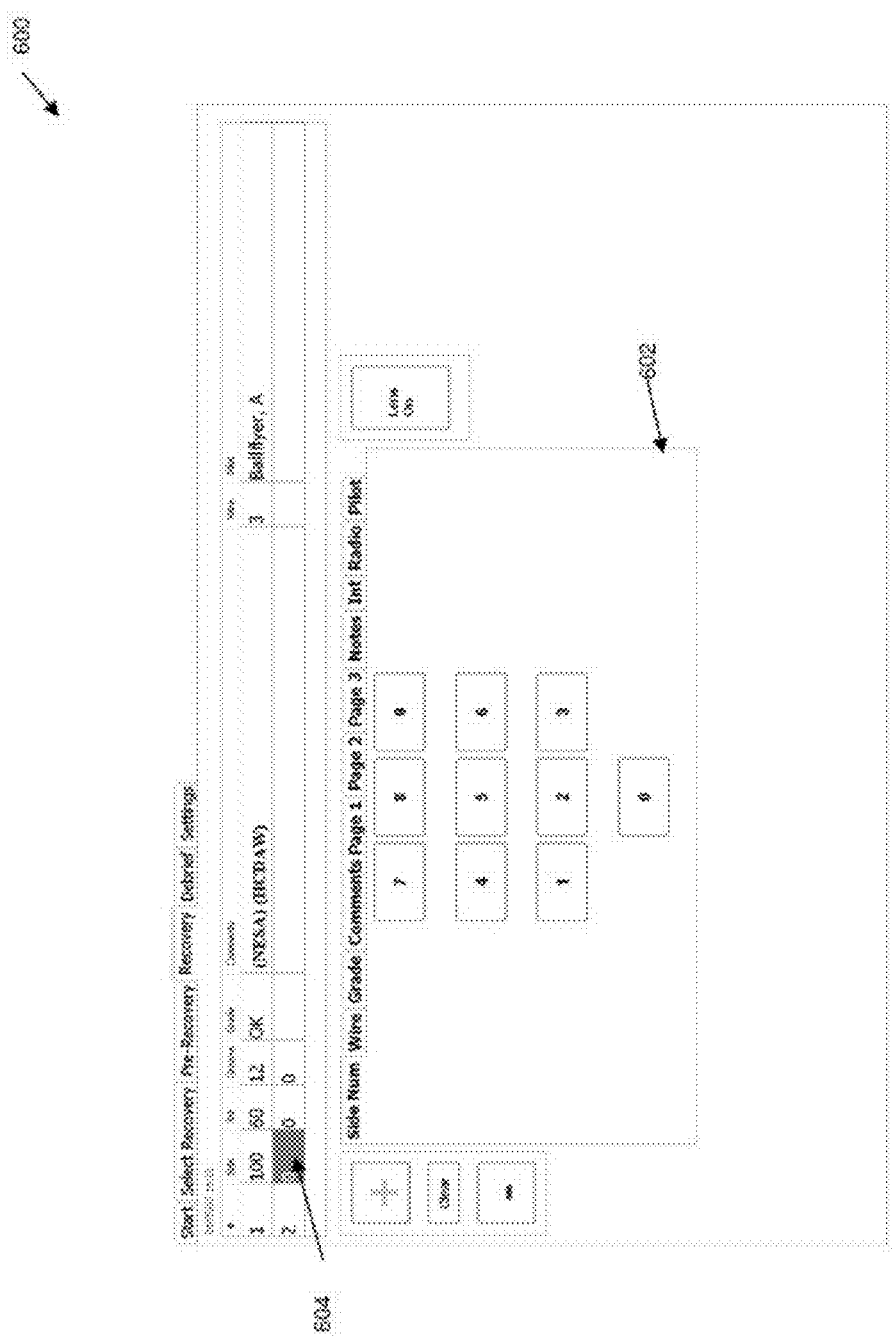
FIG. 6 illustrates an example of a context sensitive keyboard graphical user interface used to enter an aircraft's identification number in accordance with one embodiment.

FIG. 6 illustrates an example of a context sensitive keyboard graphical user interface 600 used to enter an aircraft's identification number in accordance with one embodiment. In one embodiment, the number is added via the context sensitive keyboard 602. The highlighted box 604 indicates the data entry area for the number.

Figure 7:
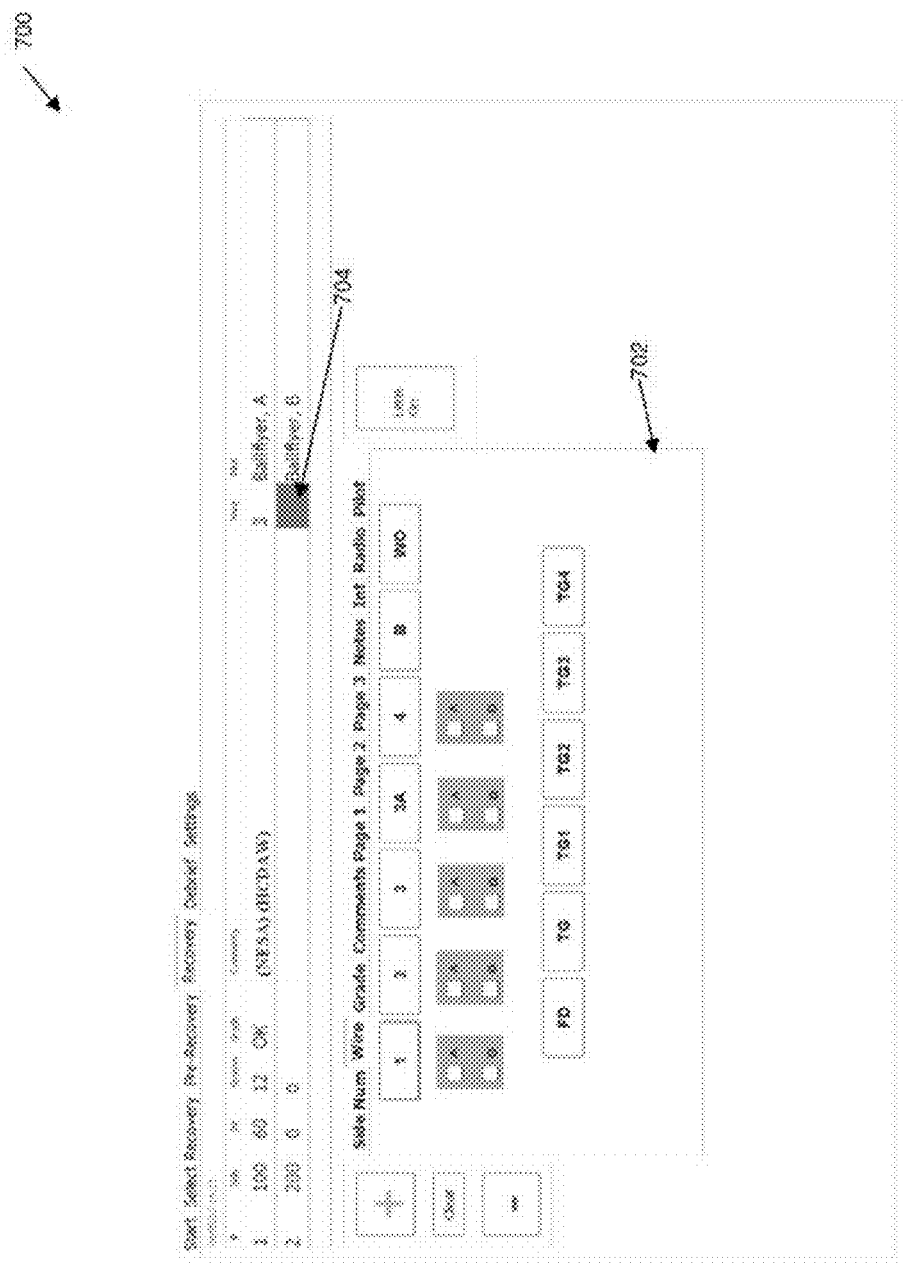
FIG. 7 illustrates an example of a context sensitive keyboard graphical user interface used to enter the arresting wire the aircraft caught upon landing in accordance with one embodiment.

FIG. 7 illustrates an example of a context sensitive keyboard graphical user interface 700 used to enter the arresting wire the aircraft caught upon landing in accordance with one embodiment. In one embodiment, the wire identifier is added via the context sensitive keyboard 702. The highlighted box 704 indicates the data entry area for the wire identifier.

Figure 8:
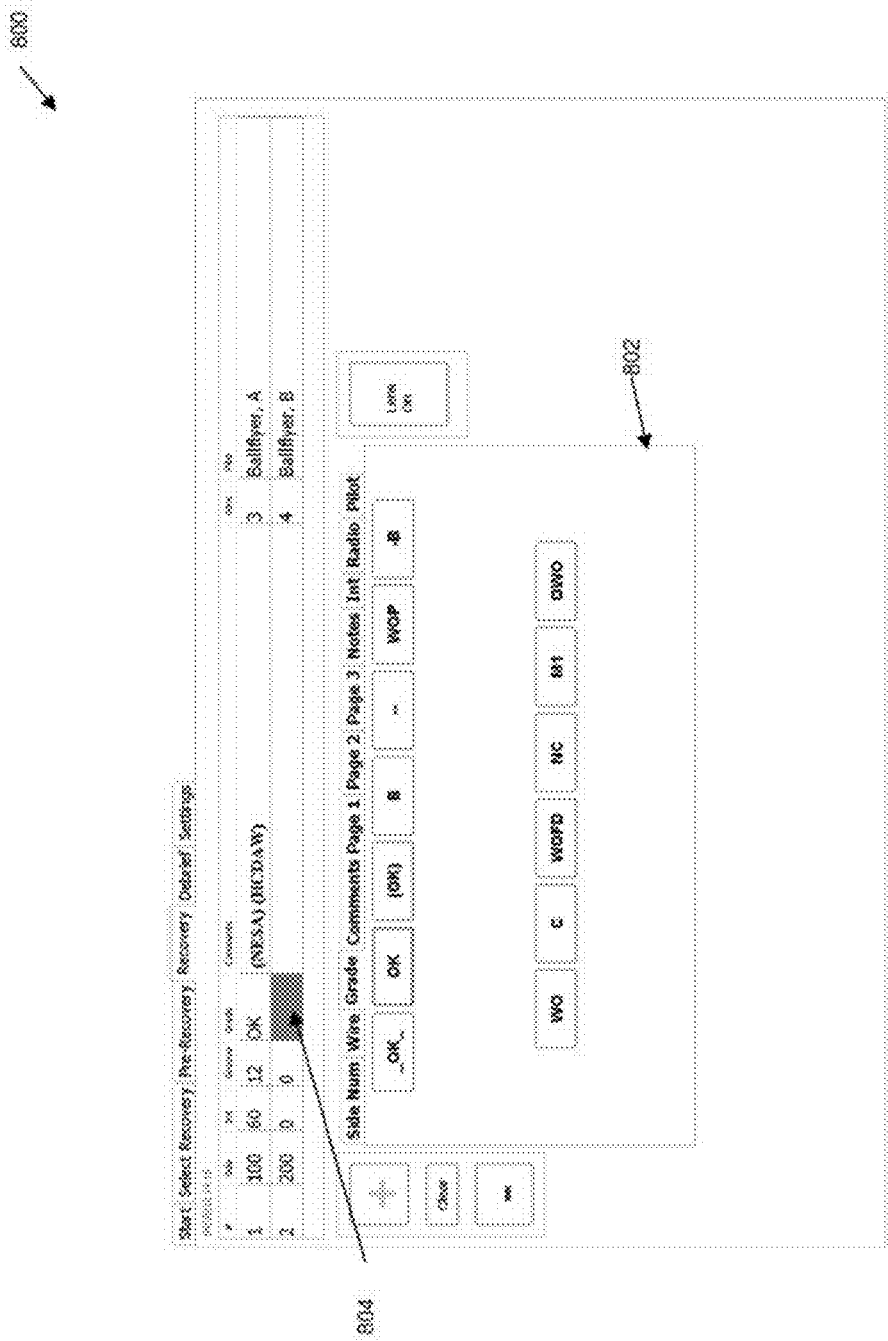
FIG. 8 illustrates an example of a context sensitive keyboard graphical user interface used to enter the grade assigned to the landing by the LSO in accordance with one embodiment.

FIG. 8 illustrates an example of a context sensitive keyboard graphical user interface 800 used to enter the grade assigned to the landing by the LSO in accordance with one embodiment. In one embodiment, the grade is added via the context sensitive keyboard 802. The highlighted box 804 indicates the data entry area for the grade.

Figure 9:
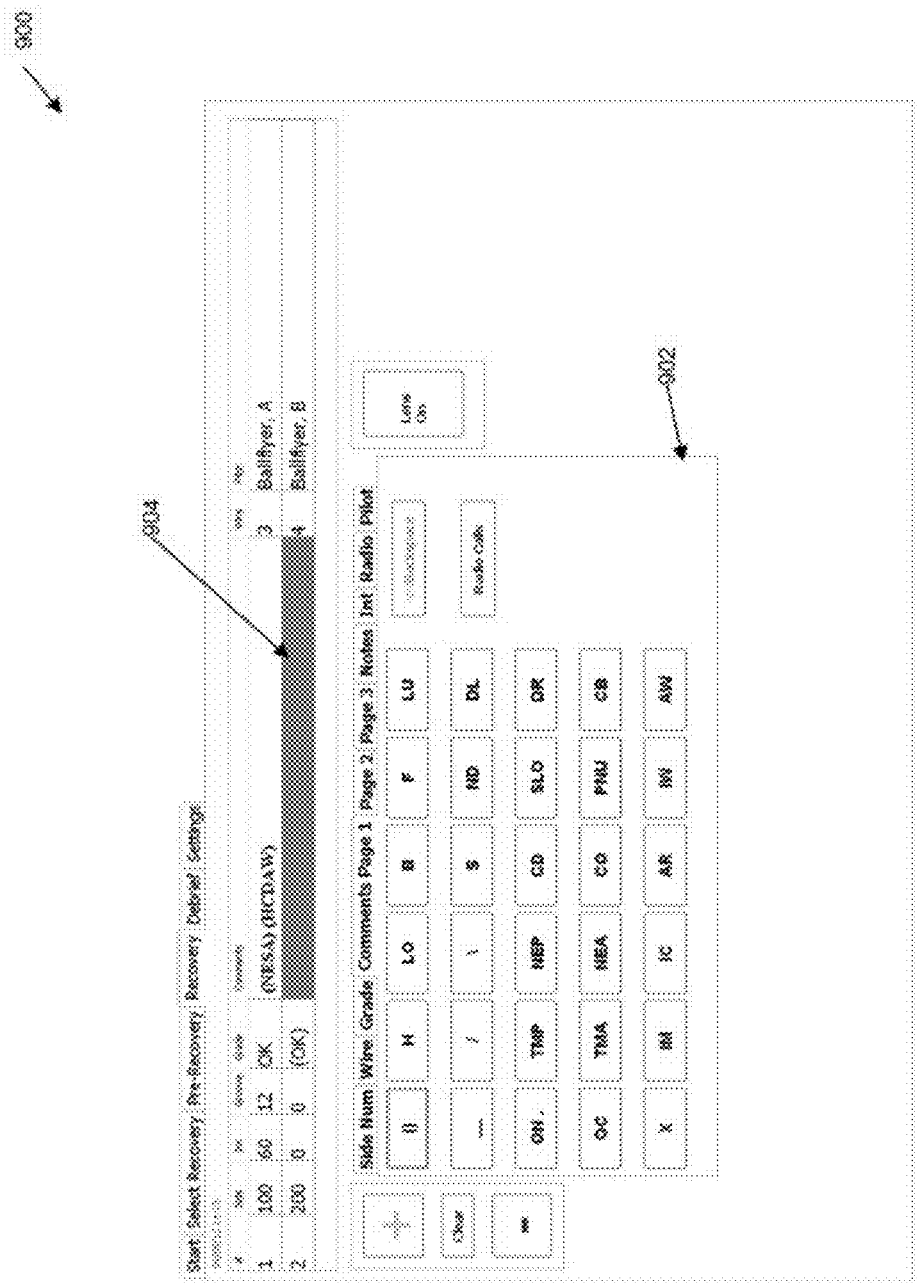
FIG. 9 illustrates an example of a context sensitive keyboard graphical user interface containing the most frequently used shorthand symbols which the LSO combines to describe the qualities of the approach and landing in accordance with one embodiment.

FIG. 9 illustrates an example of a context sensitive keyboard graphical user interface 900 containing the most frequently used shorthand symbols which the LSO combines to describe the qualities of the approach and landing in accordance with one embodiment. In one embodiment, the symbols are added via the context sensitive keyboard 902. The highlighted box 904 indicates the data entry area for the symbols.

Figure 10:
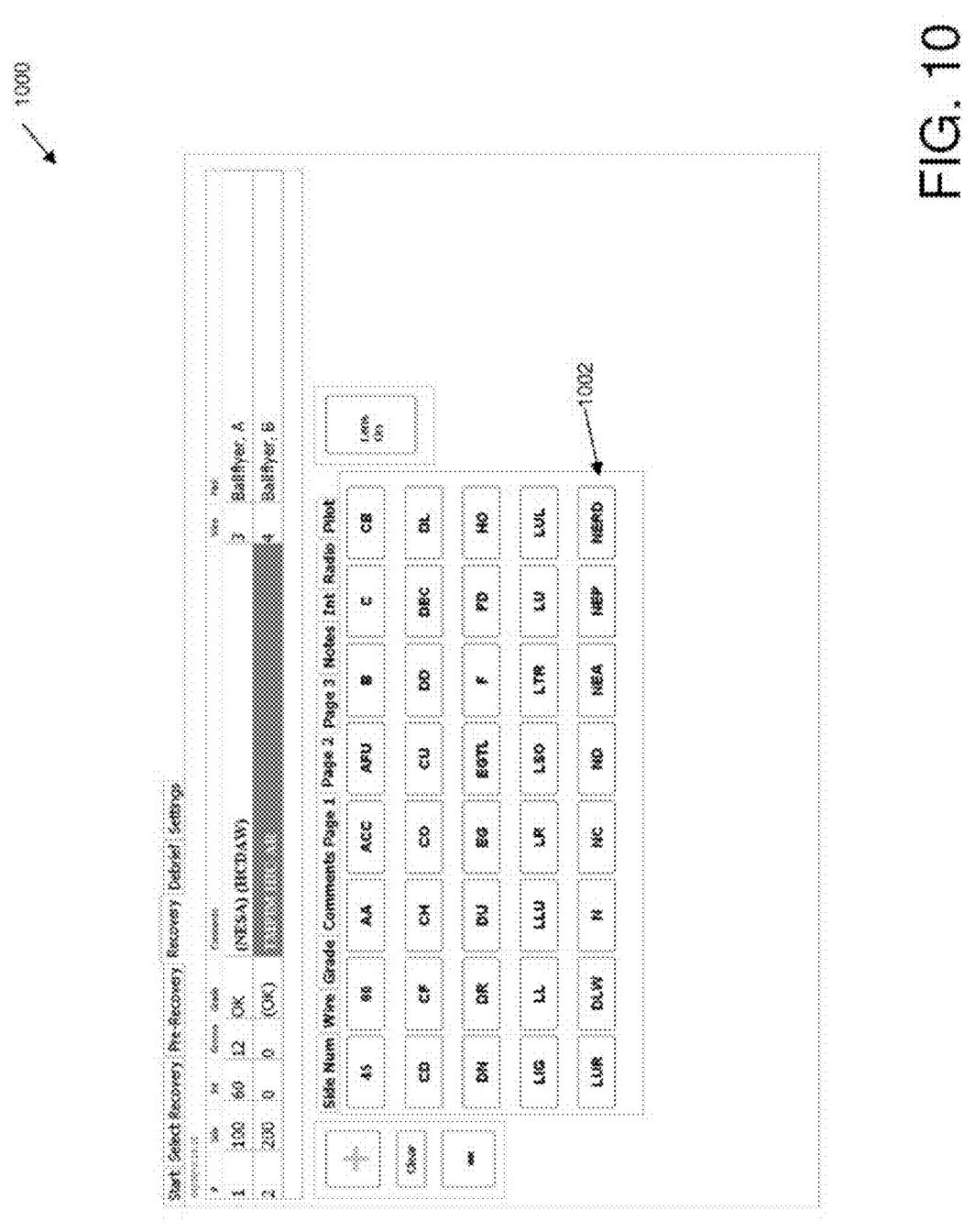

FIG. 10 illustrates an example of a context sensitive keyboard graphical user interface 1000 containing shorthand symbols arranged alphabetically in context sensitive keyboard 1002 from numerical symbols to the symbol "NERD" (NERD stands for Navy E-reader device) in accordance with one embodiment.

Figure 11:
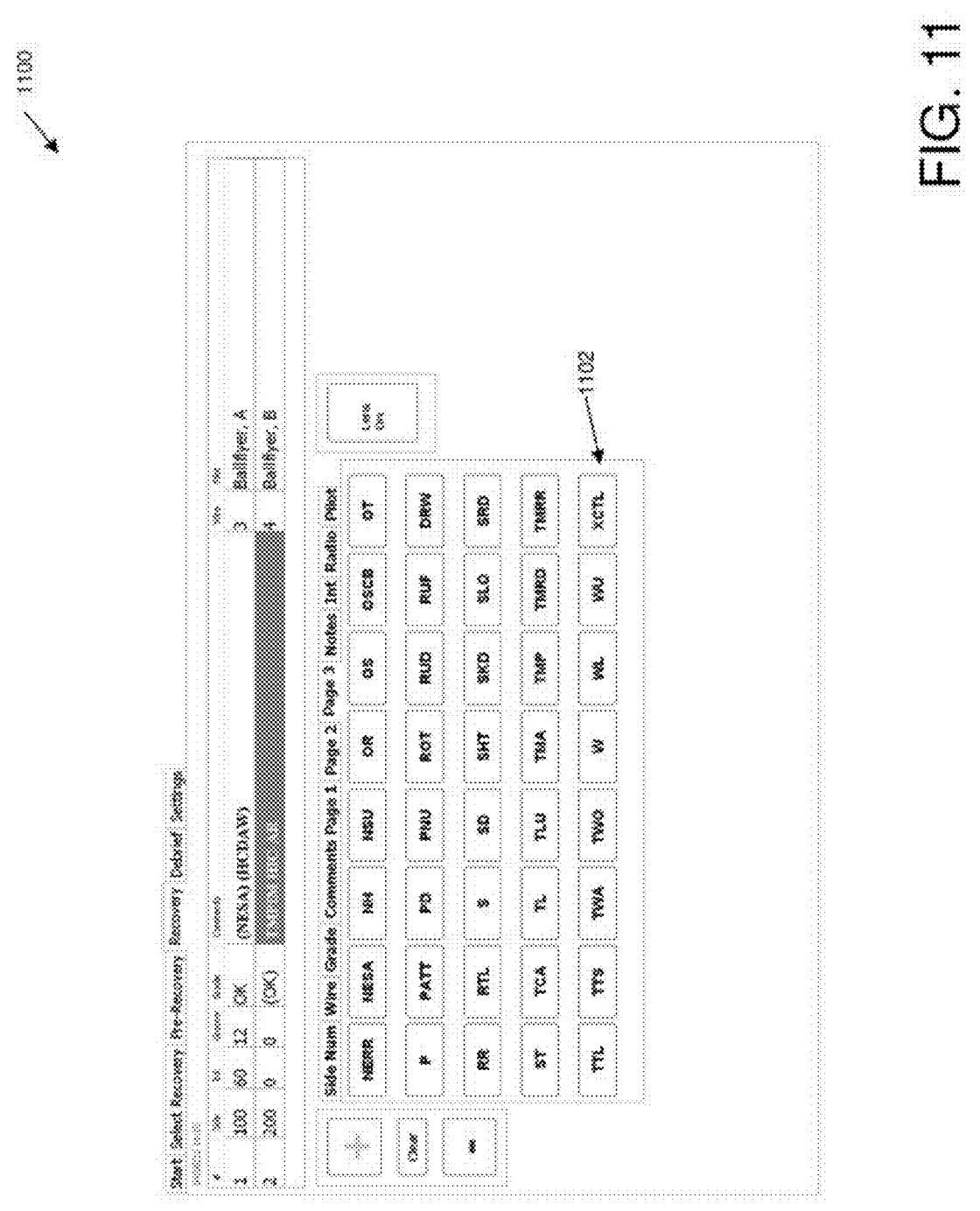

FIG. 11 illustrates an example of a context sensitive keyboard graphical user interface 1100 containing the remaining shorthand symbols not displayed in FIG. 10 arranged in context sensitive keyboard 1102 in accordance with one embodiment.

Figure 12:
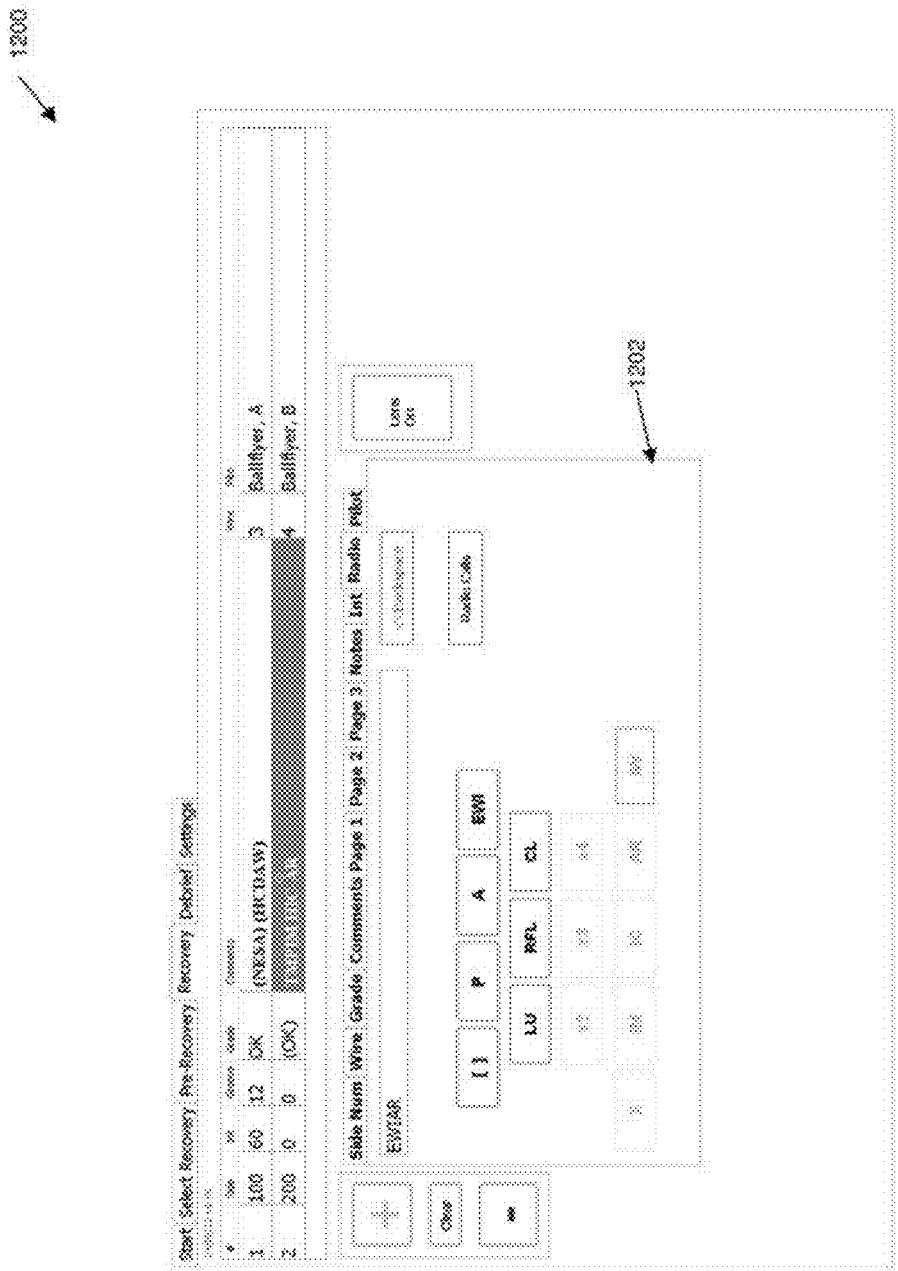
FIG. 12 illustrates an example of a context-sensitive keyboard graphical user interface used to note radio communication between the LSO and the pilot in accordance with one embodiment.

FIG. 12 illustrates an example of a context-sensitive keyboard graphical user interface 1200 used to note radio communication between the LSO and the pilot in accordance with one embodiment. In one embodiment, the notations are added via the context sensitive keyboard 1202.

Figure 13:
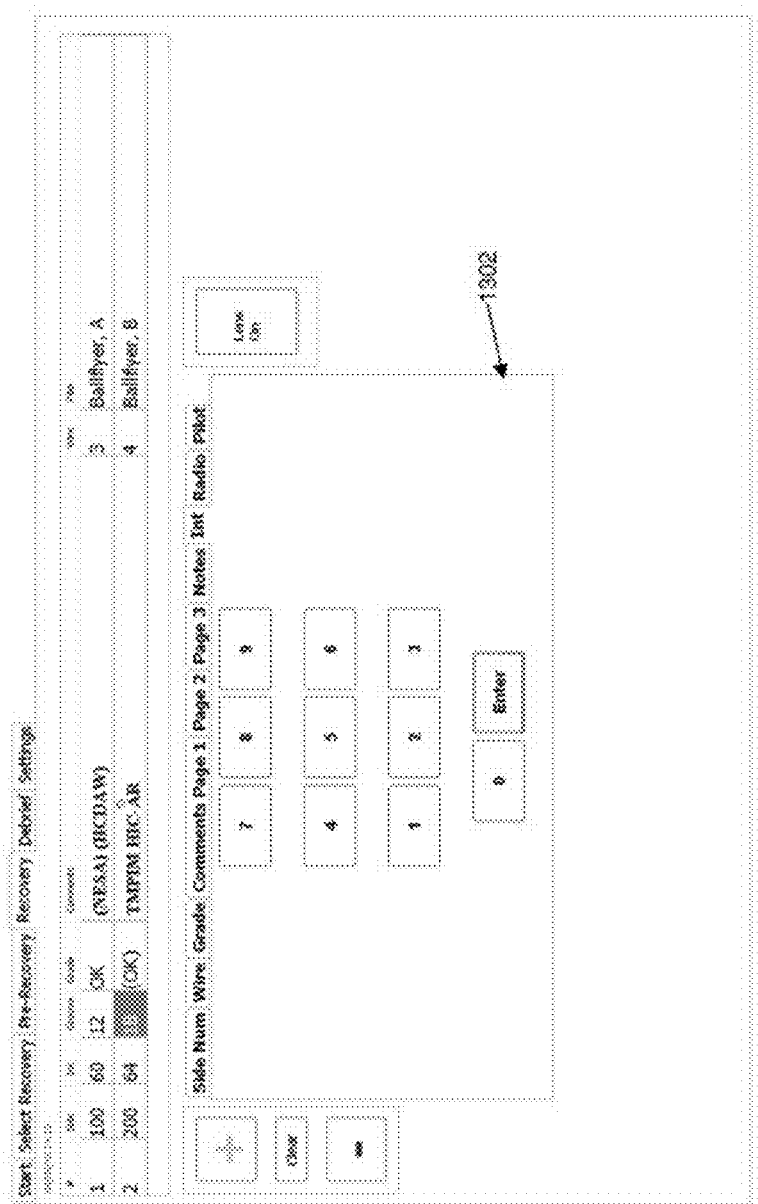
FIG. 13 illustrates an example of a context-sensitive keyboard graphical user interface used to manually enter times associated with the interval between landings or the amount of time an aircraft spends on final approach in accordance with one embodiment.

FIG. 13 illustrates an example of a context-sensitive keyboard graphical user interface 1300 used to manually enter times associated with the interval between landings or the amount of time an aircraft spends on final approach in accordance with one embodiment. In one embodiment, the times are added via the context sensitive keyboard 1302.

Figure 14:
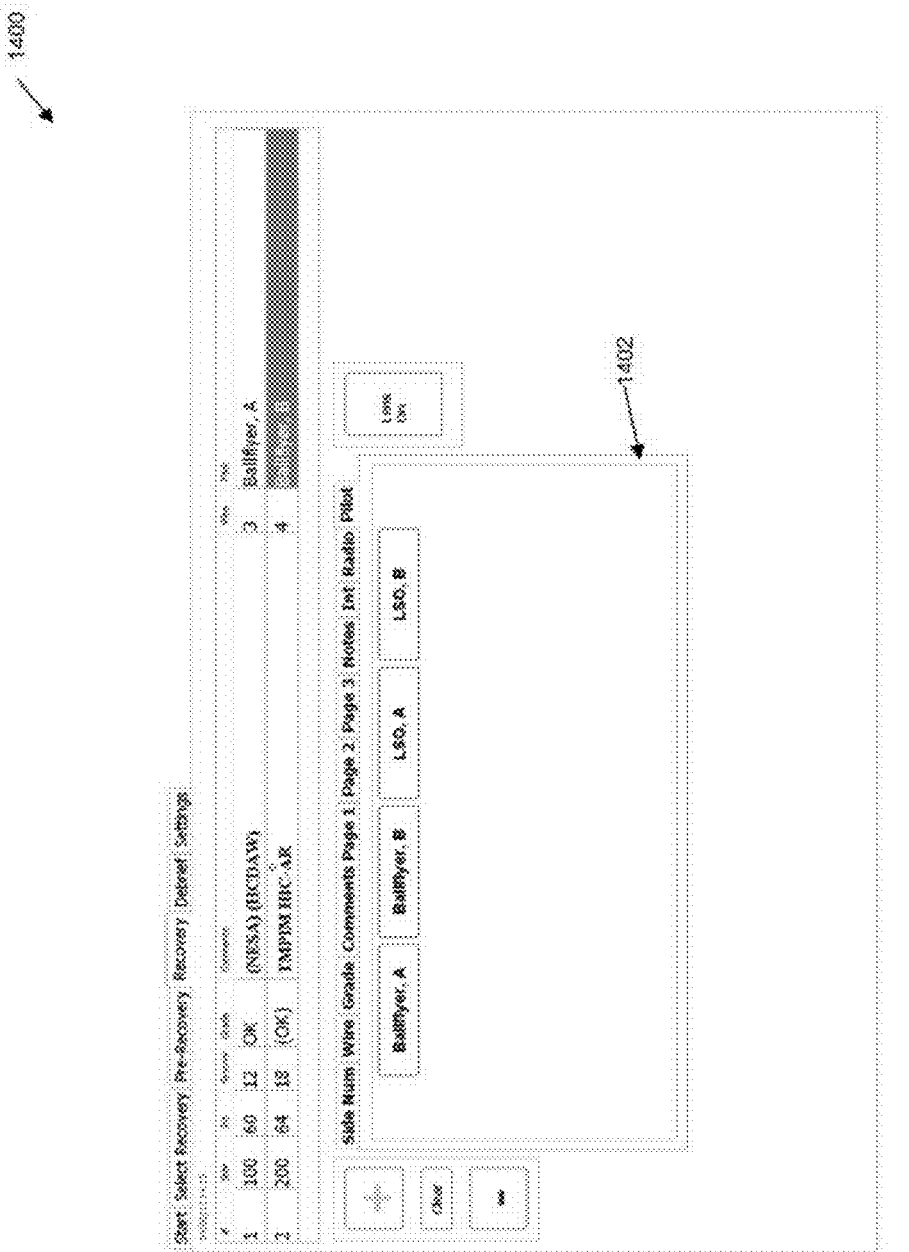
FIG. 14 illustrates an example of a context sensitive keyboard graphical user interface used to associate a pilot with an approach in accordance with one embodiment.

FIG. 14 illustrates an example of a context sensitive keyboard graphical user interface 1400 used to associate a pilot with an approach in accordance with one embodiment. In one embodiment, the pilot is added via the context sensitive keyboard 1402.

Figure 15:
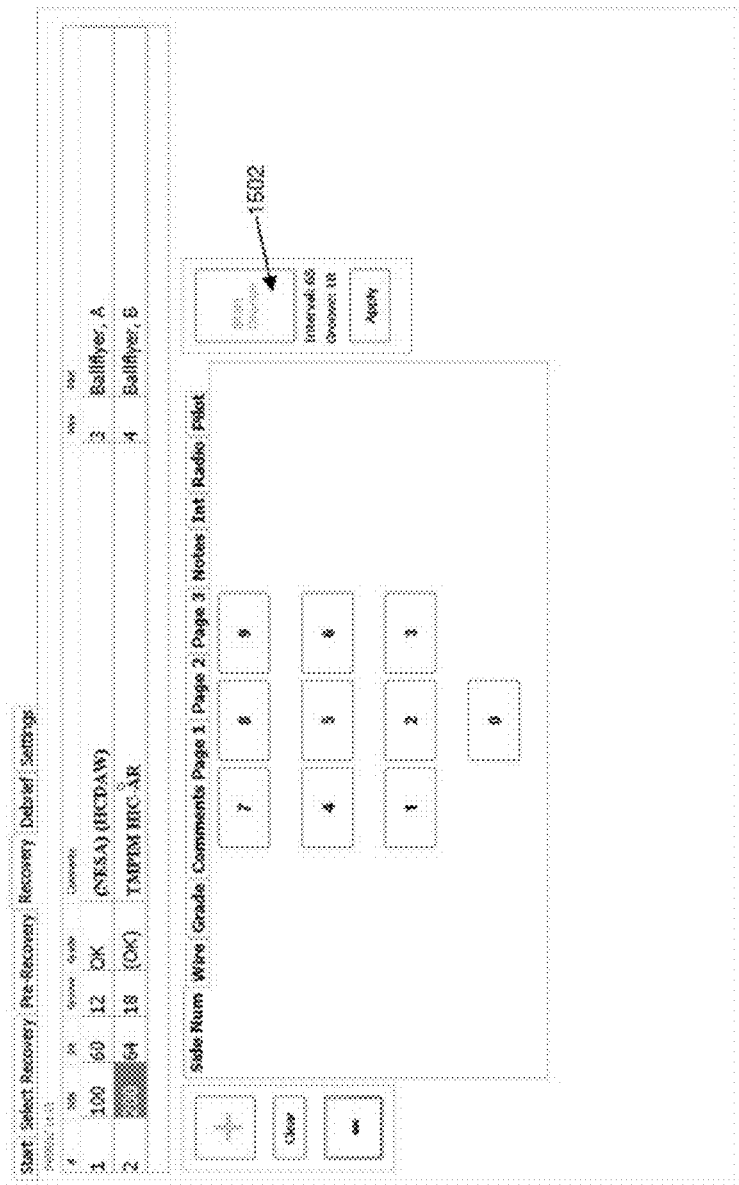
FIG. 15 illustrates an example of buttons on a graphical user interface used to time the interval between landings and the amount of time an aircraft spends on final approach in accordance with one embodiment.

FIG. 15 illustrates an example of buttons on a graphical user interface 1500 used to time the interval between landings and the amount of time an aircraft spends on final approach in accordance with one embodiment. In one embodiment, selecting and deselecting the start groove button 1502 starts and stops the interval timing.

Figure 16:
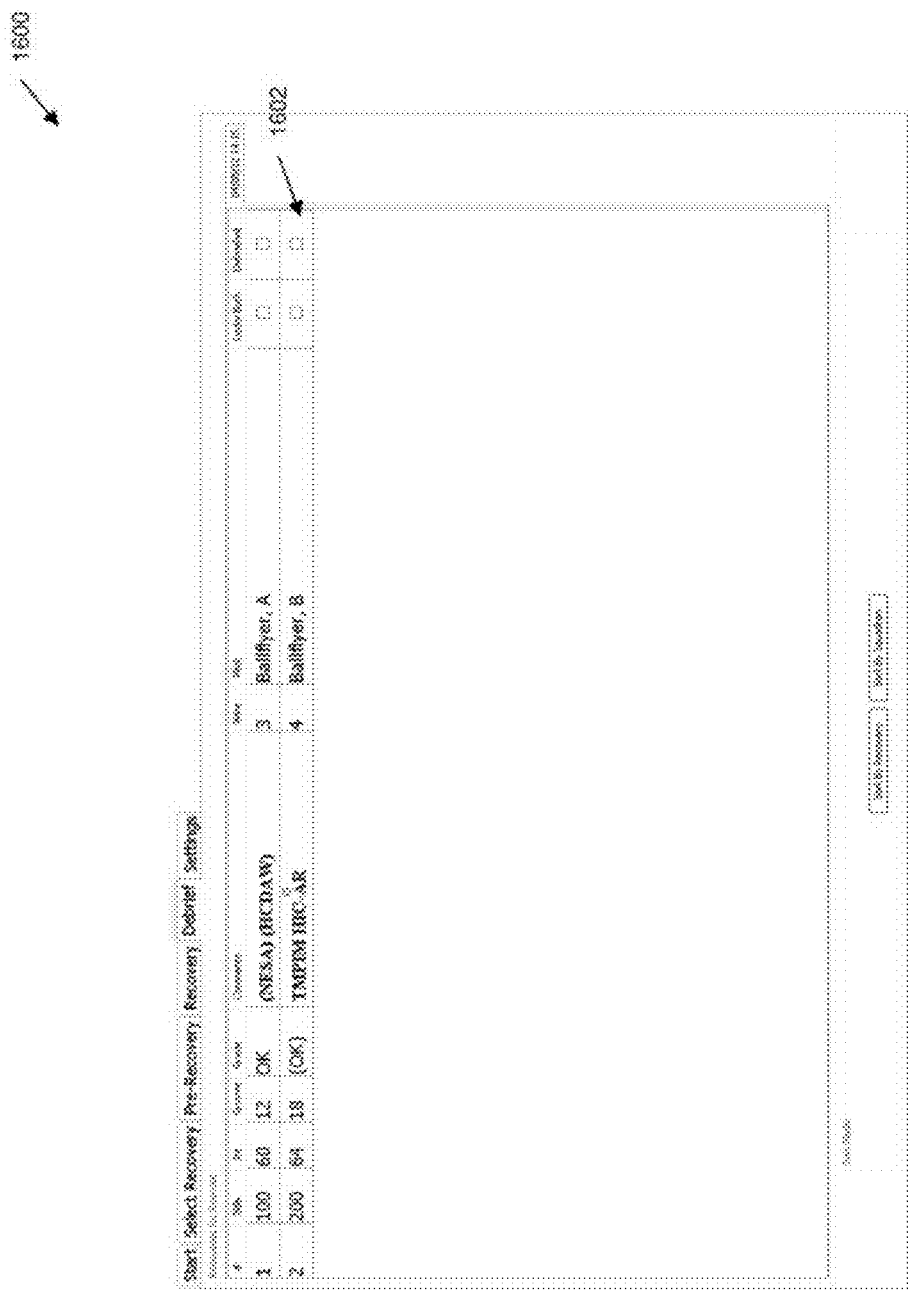
FIG. 16 illustrates an example of a default "Debrief" graphical user interface which displays records chronologically in accordance with one embodiment.

FIG. 16 illustrates an example of a default "Debrief" graphical user interface 1600 which displays records chronologically in accordance with one embodiment. In one embodiment, the records are displayed chronologically in menu 1602.

Figure 17:
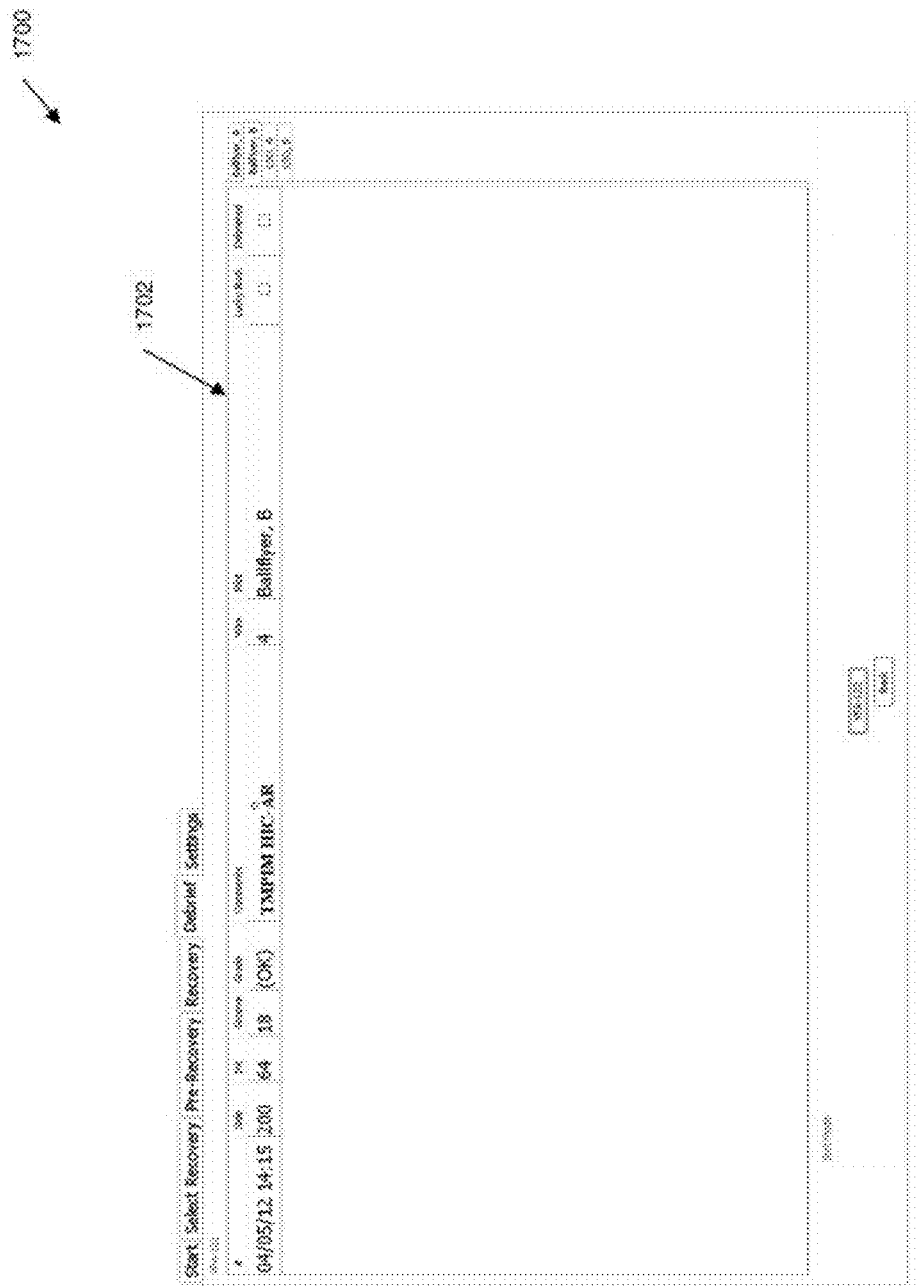
FIG. 17 illustrates an example of debrief graphical user interface which displays records based on military unit and individual pilot in accordance with one embodiment.

FIG. 17 illustrates an example of debrief graphical user interface 1700 which displays records based on military unit and individual pilot in accordance with one embodiment. In one embodiment, the records are displayed chronologically in menu 1702.

Figure 18:
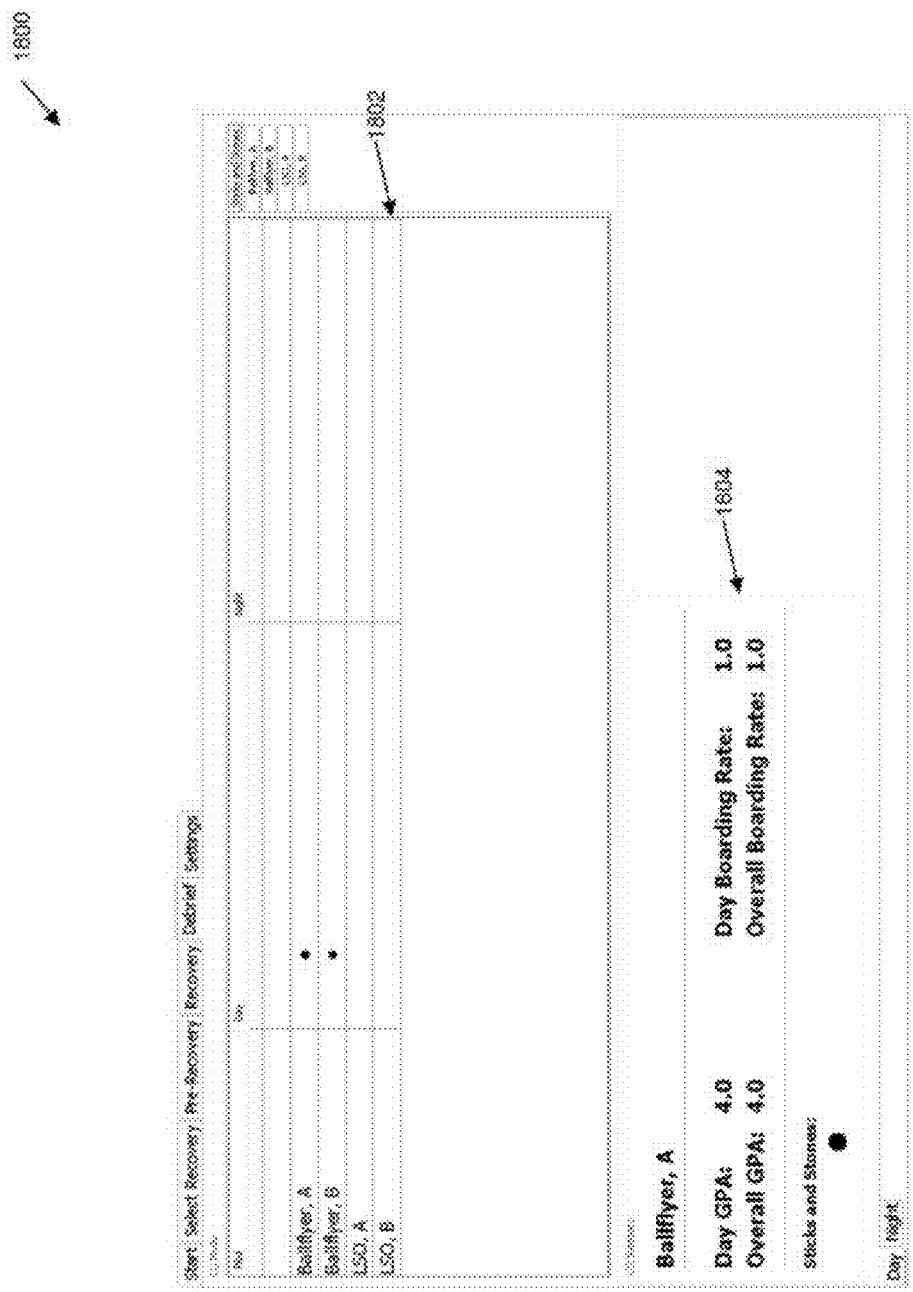
FIG. 18 illustrates an example of debrief graphical user interface used during carrier qualification training which displays the number of "touch-and-go" and "arrested" landings performed by each pilot, as well as the calculated grade point average and boarding rate for each pilot in accordance with one embodiment.

FIG. 18 illustrates an example of debrief graphical user interface 1800 used during carrier qualification training which displays the number of "touch-and-go" and "arrested" landings performed by each pilot, as well as the calculated grade point average and boarding rate for each pilot in accordance with one embodiment. In one embodiment, the records are displayed chronologically in menu 1802 and a summary is displayed in menu 1804.

Figure 19:
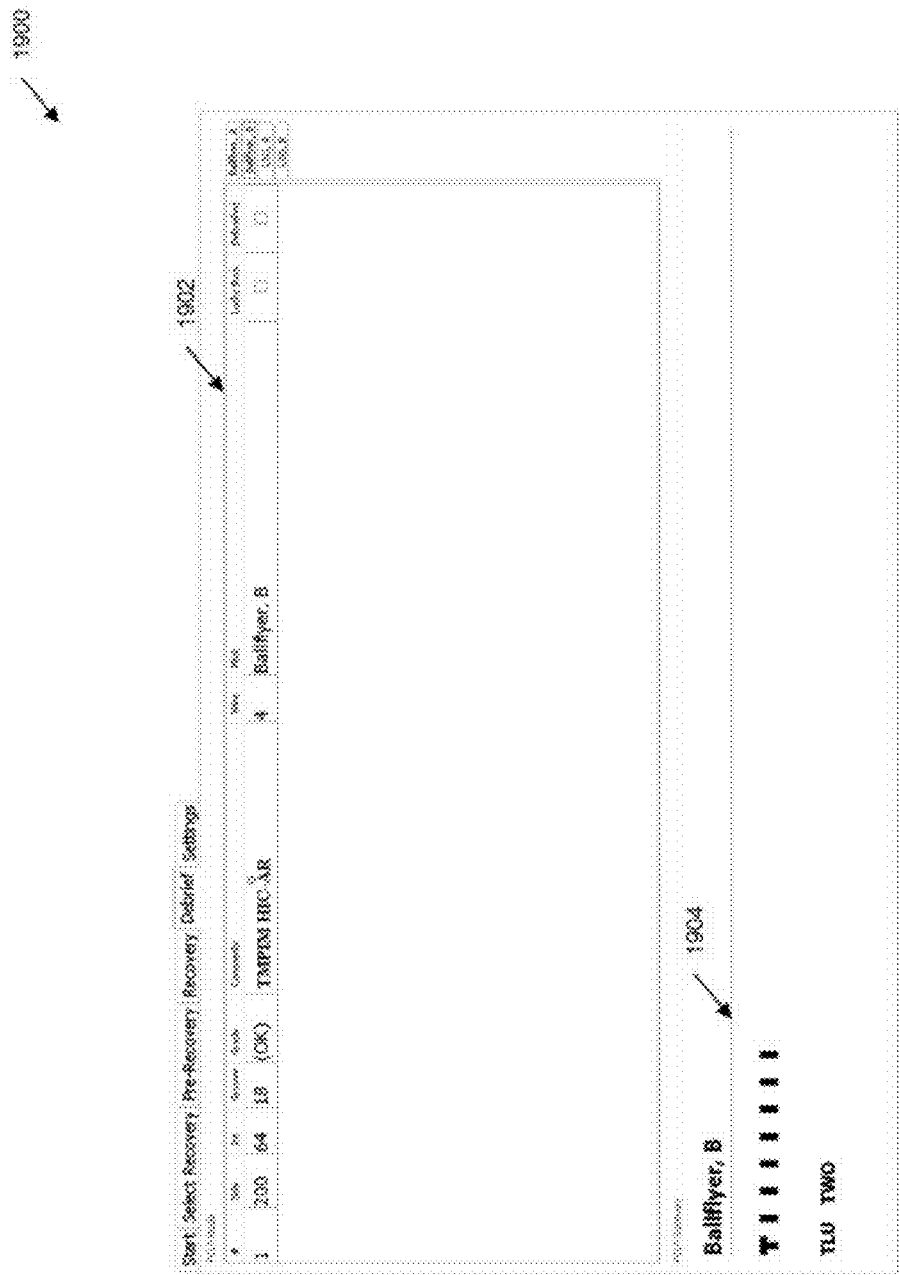
FIG. 19 illustrates an example of debrief graphical user interface used during field carrier landing practice which displays the number and type of landings performed by each pilot in accordance with one embodiment.

FIG. 19 illustrates an example of debrief graphical user interface 1900 used during field carrier landing practice which displays the number and type of landings performed by each pilot in accordance with one embodiment. In one embodiment, the number and type of landings are displayed in menu 1902 and a summary is displayed in menu 1904.

Figure 20:
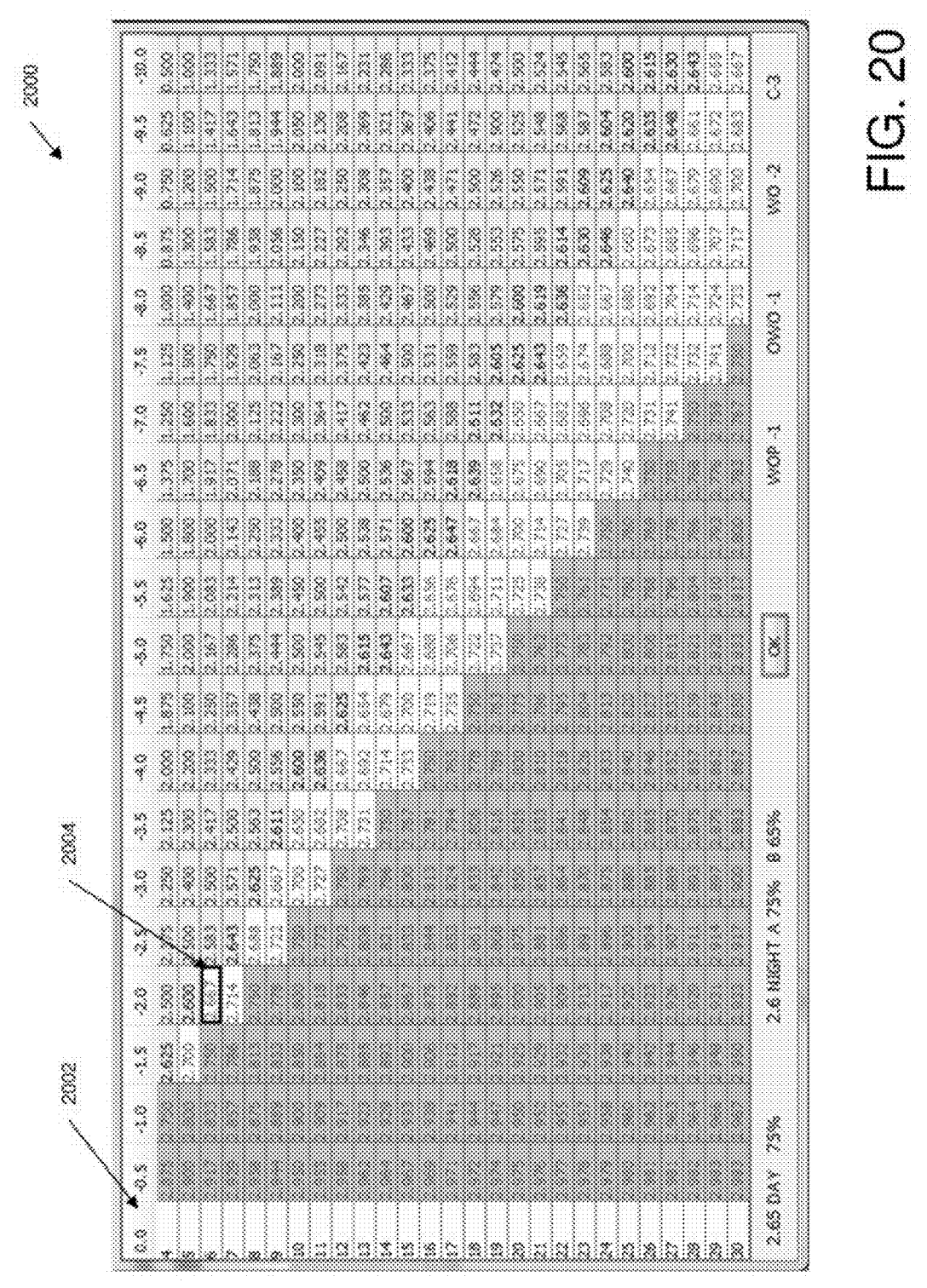

FIG. 20 illustrates an example of "cumulative grade table," a graphical user interface 2000 based on a paper table that LSOs use to reference the current pilot performance in accordance with one embodiment. In one embodiment, the table cell associated with the current pilot performance is automatically highlighted, for example, cell 2002, in the grade table 2002.

Figure 21:
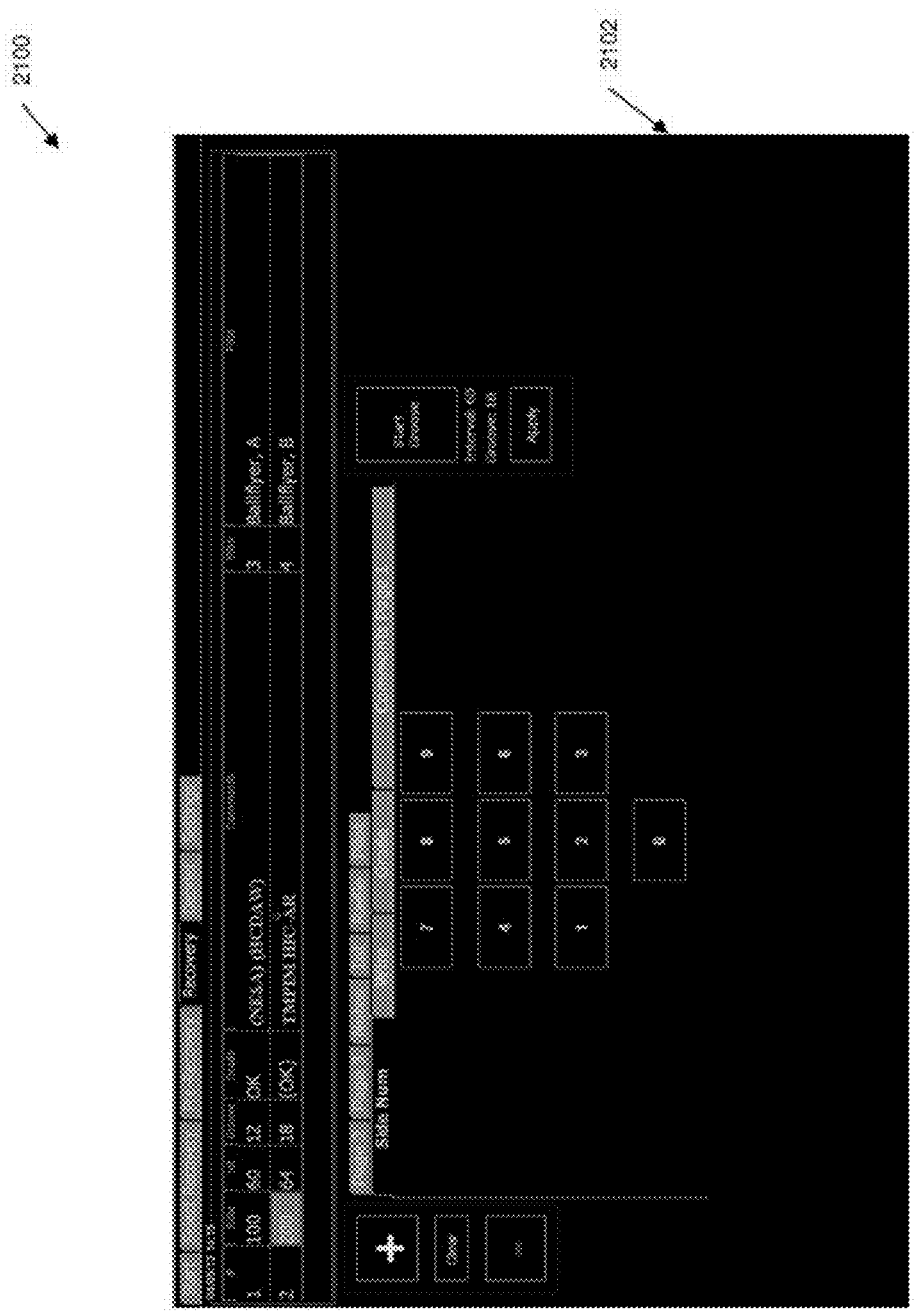
FIG. 21 illustrates an example of "night mode" of a graphical user interface which is designed to have a minimal impact on a Landing Signal Officer's night vision adaptation during nighttime operations in accordance with one embodiment.

FIG. 21 illustrates an example of "night mode" of a graphical user interface 2100 which is designed to have a minimal impact on a Landing Signal Officer's night vision adaptation during nighttime operations in accordance with one embodiment. In one embodiment, the background 2102 is a dark color, such as black, and the readable portions displayed to a user are displayed in a night vision compatible color, such as green, or dark green (shown as white and gray in FIG. 21). In various embodiments, other minimal night vision impact colors can be selected for use as a background color or readable display portions.

Figure 22:
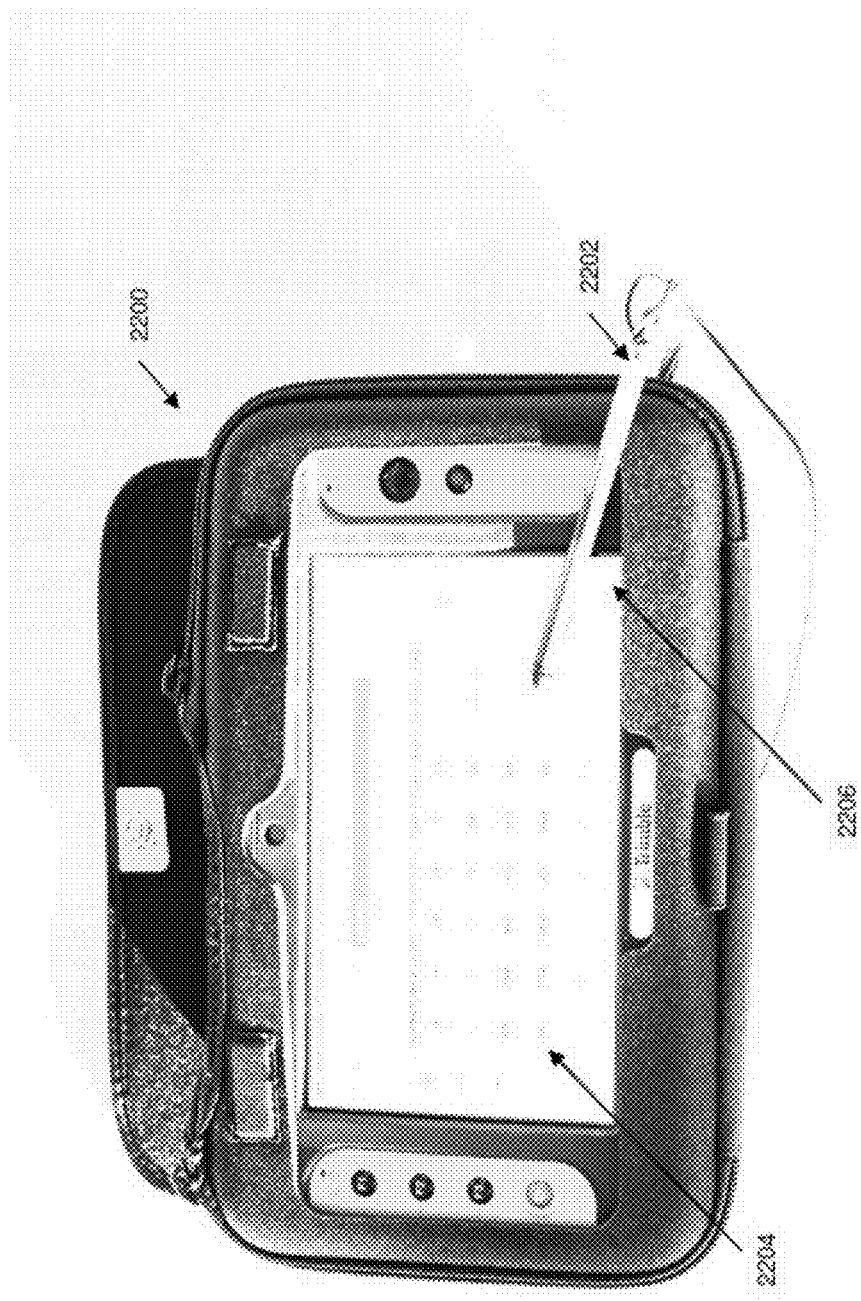
FIG. 22 illustrates an example of a touch screen handheld device with attached stylus displaying a graphical user interface generated by the user method application in accordance with one embodiment.

FIG. 22 illustrates an example of a touch screen handheld device 2200 with attached stylus 2202 displaying a graphical user interface 2204 generated by the user method application in accordance with one embodiment. In one embodiment, device 2200, i.e., device 102 (FIG. 1) includes a touch-screen display 2206 for use with stylus 2202 or a bare finger of a user. In one embodiment, touch screen display 2206 has sufficient resolution to display the virtual GUI keyboards such as those earlier described and shown with reference to FIGS. 2-21, and other screens and a viewable display area sufficient in size so that the interactive elements such as buttons can be conveniently and reliably pressed by the user. In various embodiments, device 2200 can further include: a ruggedized and waterproof casing; one or more hardware buttons for ease-of-access; an attachment device to connect the stylus, e.g., stylus 2202, to device 2200; and a harness to allow a user to wear device 2200 for extended periods of time.

Thus has been described a system for electronically capturing landing performance data related to aircraft approaches and landings in a IMTA application 104 residing on a portable electronic device (PED) 102 and for automatically generating performance data and trend analysis of the data. Data captured and generated by IMTA application 104 can be further communicated to and updated by external computer systems, such as computer systems 106, and appended with additional data and/or video available from external computer systems.

As used herein a computer memory refers to a volatile, memory, a non-volatile, memory, or a combination of the two. Although IMTA application 104 is referred to as an application, this is illustrative only. IMTA application 104 should be capable of being called from an application or the operating system. In one embodiment, an application is generally defined to be any executable code. Moreover, those of skill in the art will understand that when it is said that an application or an operation takes some action, the action is the result of executing one or more instructions by a processor. Herein a computer program product includes a medium configured to store or transport computer readable code in accordance with an embodiment of the invention. Some examples of computer program products are CD-ROM discs, DVDs, ROM cards, floppy discs, magnetic tapes, computer hard drives, servers on a network and signals transmitted over a network representing computer readable code.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. An aircraft landing system for generating aircraft landing data for an aircraft comprising:
   a touch screen;
   a computer memory where the computer memory stores at least 80 shorthand symbols where each of the at least 80 shorthand symbols comprise at least one and less than four characters, and where each of the at least 80 shorthand symbols represents an evaluation comment employed by a landing signal officer to describe landing performance data during an arrested landing, and where at least 10 of the at least 80 shorthand symbols are designated as frequently used LSO shorthand terms;
   a central processing unit in data communication with the touch screen and the computer memory, where the central processing unit is configured to:
   retrieve the at least 80 shorthand symbols from the memory; and
   direct the touch screen to:
      display a first page of shorthand symbols where the first page of shorthand symbols comprises the frequently used LSO shorthand terms;
      display an additional page tab;
      display an additional page of shorthand symbols when the additional page tab is activated on the touch screen, where the additional page of shorthand symbols does not comprise at least 5 of the at least 10 shorthand symbols designated as frequently used LSO shorthand terms.

2. The aircraft landing system of claim 1 where the central processing unit is further configured to:
   receive a list of aircraft identification numbers where the list of aircraft identification numbers comprises one or more aircraft identification numbers;
   provide a communication to the touch screen where the communication directs the touch screen to display at least one aircraft identification number from the list of aircraft identification numbers;
   receive a reply from the touch screen where the reply is a communication from the touch screen generated when one of the at least one aircraft identification numbers is activated on the touch screen;
   provide an additional communication to the touch screen where the additional communication directs the touch screen to display a start keypad button;
   receive an additional reply from the touch screen where the additional reply is a communication from the touch screen generated when the start keypad button is activated on the touch screen;
   receive a further reply from the touch screen where the further reply is a communication from the touch screen generated when a particular button is activated on the touch screen;
   receive one or more subsequent replies from the touch screen where the one or more subsequent replies are each generated when one of the at least 80 shorthand symbols are activated on the touch screen;
   determine an elapsed time between the additional reply and the further reply; and
   associate the one or more subsequent replies and the elapsed time with the one of the at least one aircraft identification number and generate the aircraft landing data, where the aircraft landing data comprises the at least one aircraft identification number, the one or more subsequent replies, and the elapsed time.

3. The aircraft landing system of claim 2 where the central processing unit is further configured to direct the touch screen to display the aircraft landing data.

4. The aircraft landing system of claim 2 where the central processing unit is further configured to communicate the aircraft landing data to one or more computer devices.

5. A method for collecting aircraft landing data using the system of claim 2 comprising:
   inputting a collection of aircraft identification numbers to the central processing unit, thereby providing the list of aircraft identification numbers to the central processing unit;
   observing the at least one aircraft identification number present on the touch screen as a result of the communication sent from the central processing unit to the touch screen;
   activating one of the at least one aircraft identification numbers on the touch screen, thereby generating the reply;

observing the start keypad button present on the touch screen as a result of the additional communication sent from the central processing unit to the touch screen;

observing an aircraft proceeding toward an arresting wire and activating the start keypad button on the touch screen, thereby generating the additional reply from the touch screen to the central processing unit;

observing an aircraft contacting the arresting wire and activating the particular button on the touch screen, thereby generating the further reply from the touch screen to the central processing unit;

allowing the central processing unit to determine the elapsed time between the additional reply and the further reply;

observing the first page of shorthand symbols present on the touch screen and activating one or more of the frequently used LSO shorthand terms on the touch screen, thereby generating the one or more subsequent replies; and allowing the central processing unit to associate the one or more subsequent replies and the elapsed time with the one of the at least one aircraft identification number and generate the aircraft landing data, thereby collecting the aircraft landing data.

6. An aircraft landing system for generating aircraft landing data for an aircraft during an arrested landing comprising:

a touch screen;

a computer memory where the computer memory stores at least 80 shorthand symbols where each of the at least 80 shorthand symbols comprise at least one and less than four characters, and where each of the at least 80 symbols represents an evaluation comment describing landing performance data; and a central processing unit in data communication with the touch screen and the computer memory, and where the central processing unit is configured to direct the touch screen to:

display a first page of shorthand symbols where the first page of shorthand symbols comprises at least 20 and less than 40 of the at least 80 shorthand symbols stored by the memory and where the at least 20 of the at least 80 shorthand symbols comprise shorthand symbols consisting of ( ), H, LO, B, F, LU, /, \, S, X, IM, IC, AR, IW or AW;

display at least one additional page tab; and display an additional page of shorthand symbols when the at least one additional page tab is activated on the touch screen, where the additional page of shorthand symbols does not comprise shorthand symbols consisting of ( ), H, LO, _/, \, X, IM, IC, AR, IW or AW.

7. The aircraft landing system of claim 6 where the central processing unit is further configured to:

receive an aircraft identification number;

receive one or more replies from the touch screen where the one or more replies are each generated when one of the at least 80 shorthand symbols are activated on the touch screen; and associate the one or more replies with the aircraft identification number and generate the aircraft landing data, where the aircraft landing data comprises the aircraft identification number and the one or more subsequent replies.

8. The aircraft landing system of claim 7 where the central processing unit is further configured to:

provide an first communication to the touch screen where the first communication directs the touch screen to display a start keypad button;

receive an first reply from the touch screen where the first reply is a communication from the touch screen generated when the start keypad button is activated on the touch screen;

receive a second reply from the touch screen where the second reply is a communication from the touch screen generated when a particular button is activated on the touch screen;

determine an elapsed time between the first reply and the second reply; and associate the elapsed time with the aircraft landing data.

9. An aircraft landing system for generating aircraft landing data for an aircraft during an arrested landing comprising:

a touch screen;

a computer memory, where the computer memory stores at least 80 shorthand symbols and where each of the at least 80 shorthand symbols comprise at least one and less than four characters, where the at least 80 shorthand symbols comprise:

( ); H; LO; B; F; LU;

_; /; /; S; ND; DL;

X; IM; IC; AR; IW; AW;

ON; TMP: NEP; CD; SLO; DR;

OC; TMA; NEA; CO; PNU; CB;

X; IM; IC; AR; IW; AW;

CD; CF; CN; CO; CU; DD; DEC; DL;

DN; DR; DU; EG; EGTL; F; FD; NO;

P; PATT; PD; PNU; ROT; RUD; RUF; DRW;

RR; RTL; S; SD; SHT; SKD; and

SLO; and a central processing unit in data communication with the touch screen and the computer memory, and where the central processing unit is configured to:

receive an aircraft identification number;

direct the touch screen to:

display a first page of shorthand symbols where the first page of shorthand symbols comprises at least 20 and less than 40 of the at least 80 shorthand symbols stored by the memory and where the at least 20 and less than 40 of the at least 80 shorthand symbols comprise shorthand symbols consisting of ( ), H, LO, B, F, LU, /, \, or S;

display a page 2 tab;

display a page 3 tab;

display a second page of shorthand symbols when the page 2 tab is activated on the touch screen, where the second page of shorthand symbols comprises some portion of the at least 80 shorthand symbols; and display a third page of shorthand symbols when the page 3 tab is activated on the touch screen, where the third page of shorthand symbols comprises another portion of the at least 80 shorthand symbols and where the third page of shorthand symbols does not comprise any of the shorthand symbols on the second page of shorthand symbol;

receive one or more replies from the touch screen where the one or more replies are each generated when one of the at least 80 shorthand symbols are activated on the touch screen; and associate the one or more subsequent replies with the aircraft identification number and generate the aircraft landing data, where the aircraft landing data comprises the aircraft identification number and the one or more subsequent replies.

* * * * *